United States Patent
Thiagarajan et al.

(10) Patent No.: US 9,716,980 B1
(45) Date of Patent: Jul. 25, 2017

(54) GEOMETRICAL SCHEDULING ALGORITHM FOR ACOUSTIC POSITIONING BEACONS

(71) Applicant: Amazon Technologies, Inc., Seattle, WA (US)

(72) Inventors: Arvind Thiagarajan, Cambridge, MA (US); Evan Duke Jeng, Los Altos, CA (US); Andrew David Price, Santa Clara, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 22 days.

(21) Appl. No.: 14/639,583

(22) Filed: Mar. 5, 2015

(51) Int. Cl.
*G06F 15/16* (2006.01)
*H04W 4/04* (2009.01)
*H04L 5/00* (2006.01)
*H04W 4/02* (2009.01)
*G01S 1/74* (2006.01)

(52) U.S. Cl.
CPC ............. *H04W 4/04* (2013.01); *G01S 1/74* (2013.01); *H04L 5/005* (2013.01); *H04W 4/028* (2013.01)

(58) Field of Classification Search
CPC H04W 64/00; H04W 4/02; G01S 5/30; G01S 11/16
USPC ............ 455/456.1, 456.3, 456.6, 67.14
See application file for complete search history.

(56) References Cited

PUBLICATIONS

Gupta, et al. Low-complexity distributed scheduling algorithms for wireless networks. IEEE/ACM Transactions on Networking (TON) 17, No. 6 (2009): 1846-1859.
Priyantha. The Cricket Indoor Location System. PhD diss., Massachusetts Institute of Technology, 2005.
Priyantha, et al. The Cricket Indoor Location System. University Corporation for Atmospheric Research and National Center for Atmospheric Research. Earth Observing Laboratory. In-Situ Sounding Facility. Jan. 8, 2004. http://www.eol.ucar.edu/isf/facilities/isa/internal/CrossBow/PresentationOverheads/Day2_Sect14_Cricket.pdf. Downloaded on Dec. 18, 2014.
Priyantha, et al. The Cricket Location-Support System. Proceedings of the 6th Annual International Conference on Mobile Computing and Networking, pp. 32-43. ACM, 2000.
Smith, et al. Tracking Moving Devices with the Cricket Location System. Proceedings of the 2nd International Conference on Mobile systems, Applications, and Services, pp. 190-202. ACM, 2004.

*Primary Examiner* — Sam Bhattacharya
(74) *Attorney, Agent, or Firm* — Pierce Atwood LLP

(57) ABSTRACT

An improved active-beacon/passive-listener time difference of arrival navigation system that relies on the multiple beacons to transmit uncoded acoustic pulses of a same frequency that propagate in the system at a same time for high-speed device tracking. Beacons are scheduled to transmit independent of the location of listening devices in the system. Listening devices may receive multiple encoded radio frequency pulses (RF) prior to a single acoustic pulse, and then resolves which RF pulse corresponds to the acoustic pulse using triangulation techniques.

20 Claims, 31 Drawing Sheets

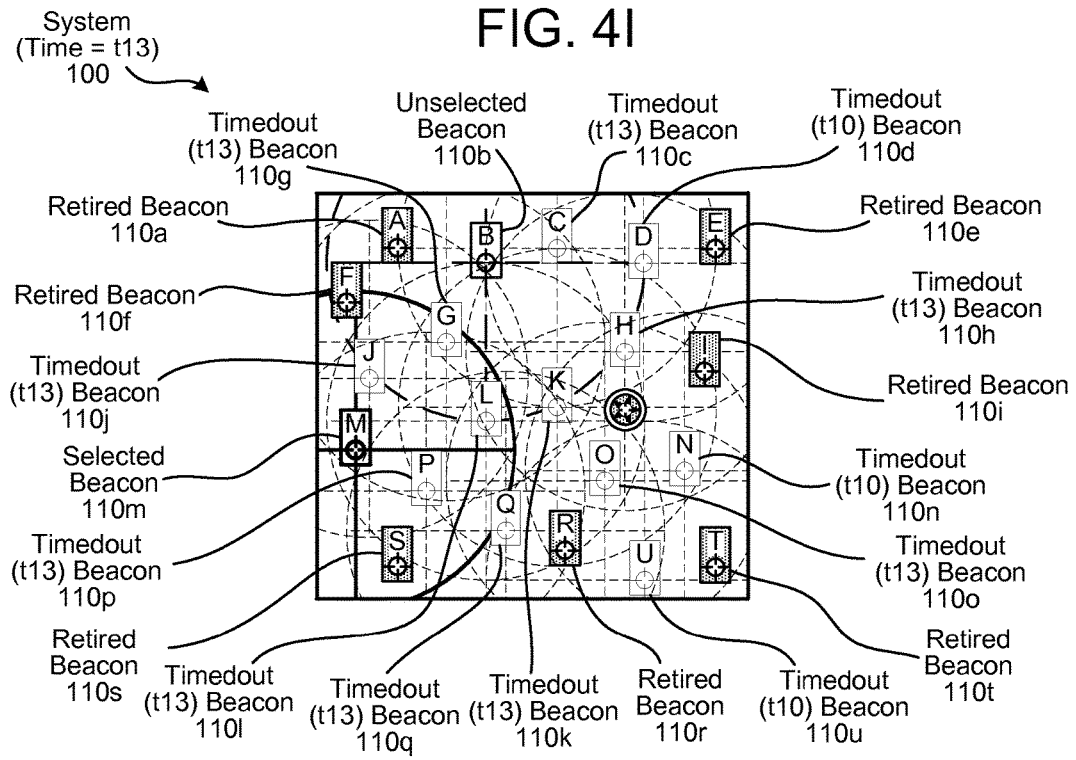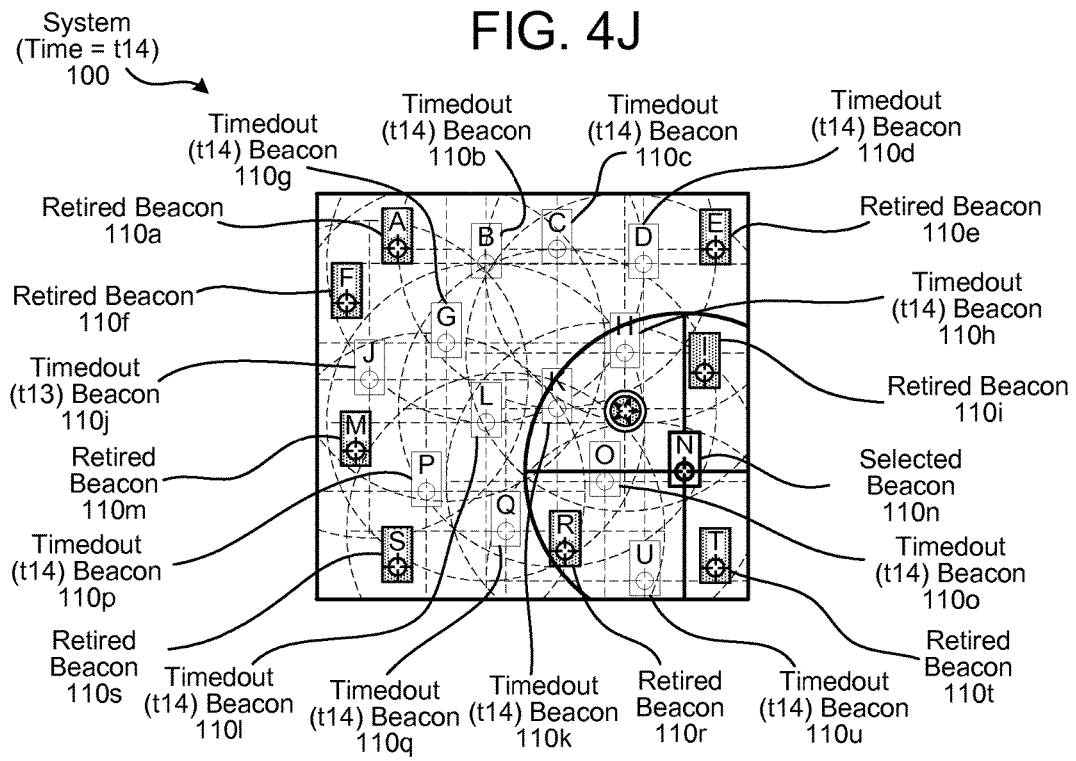

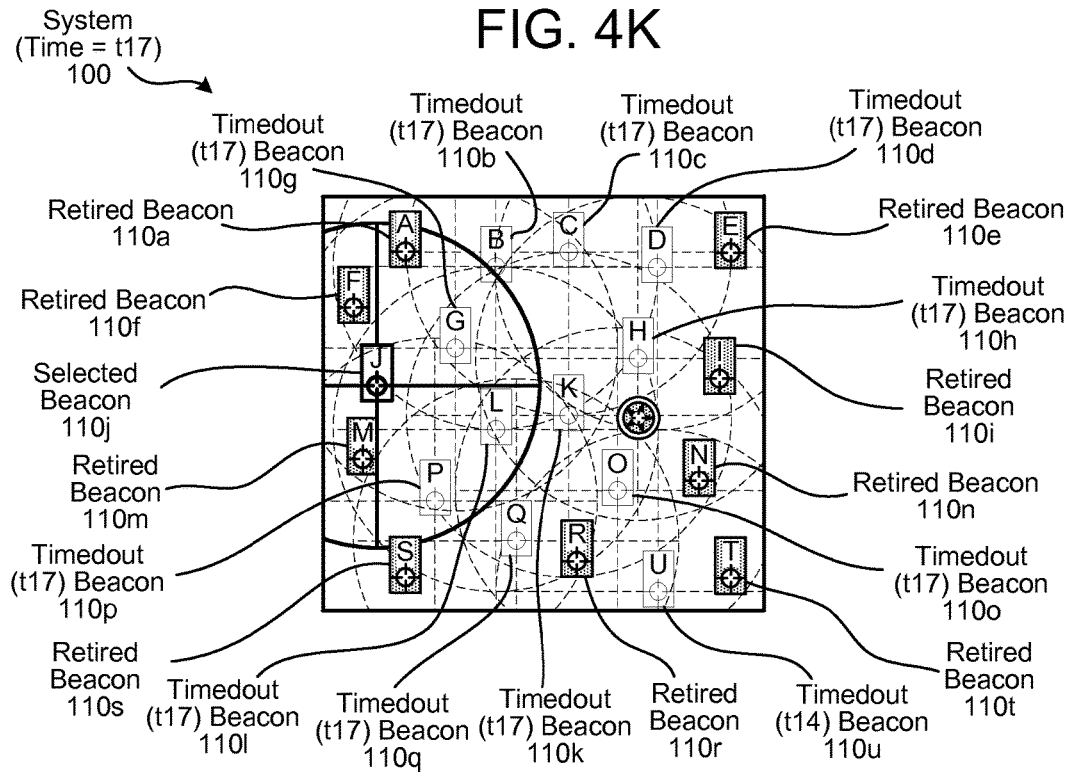

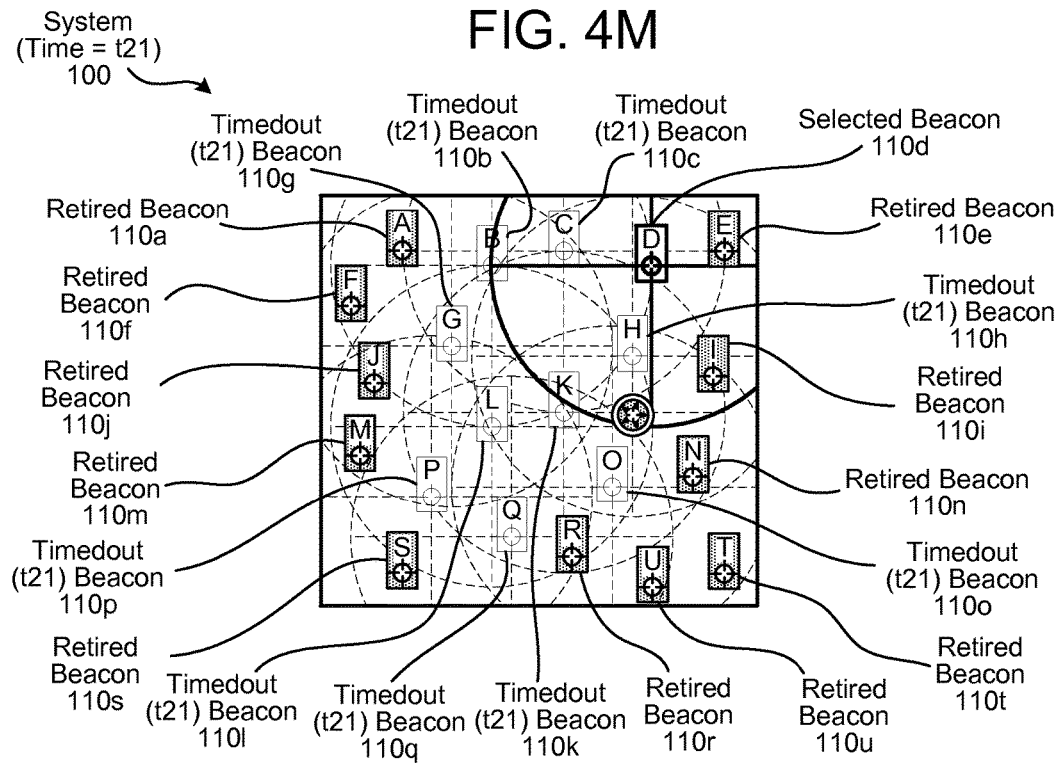
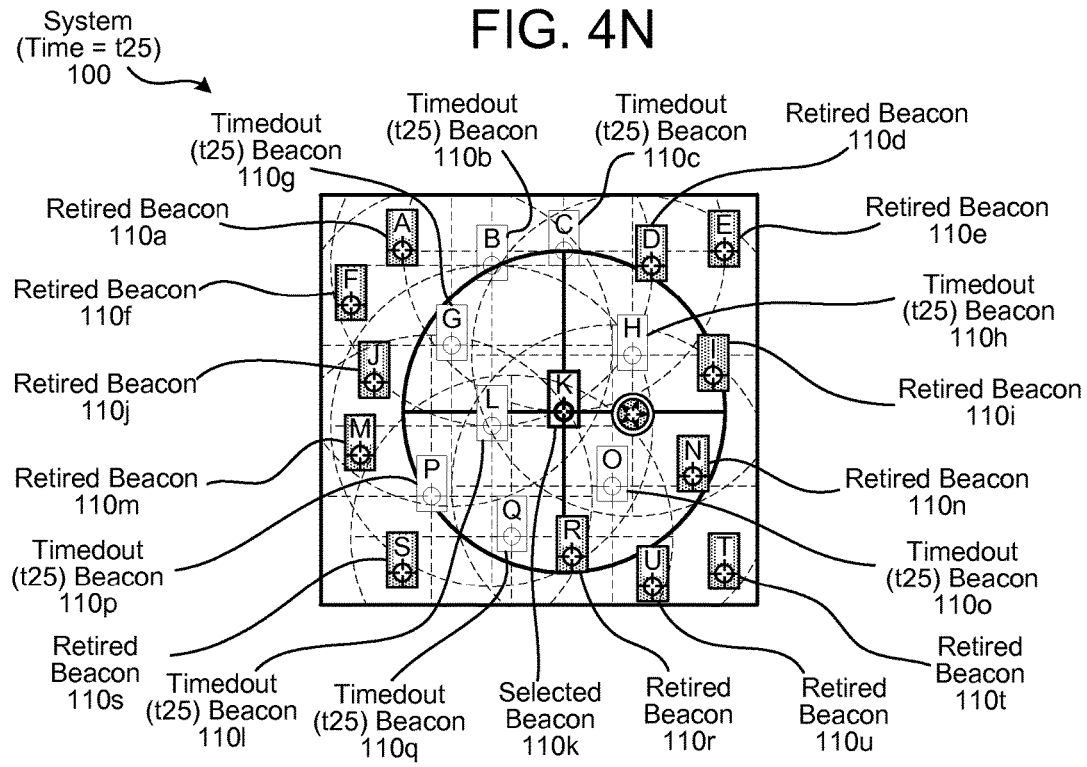

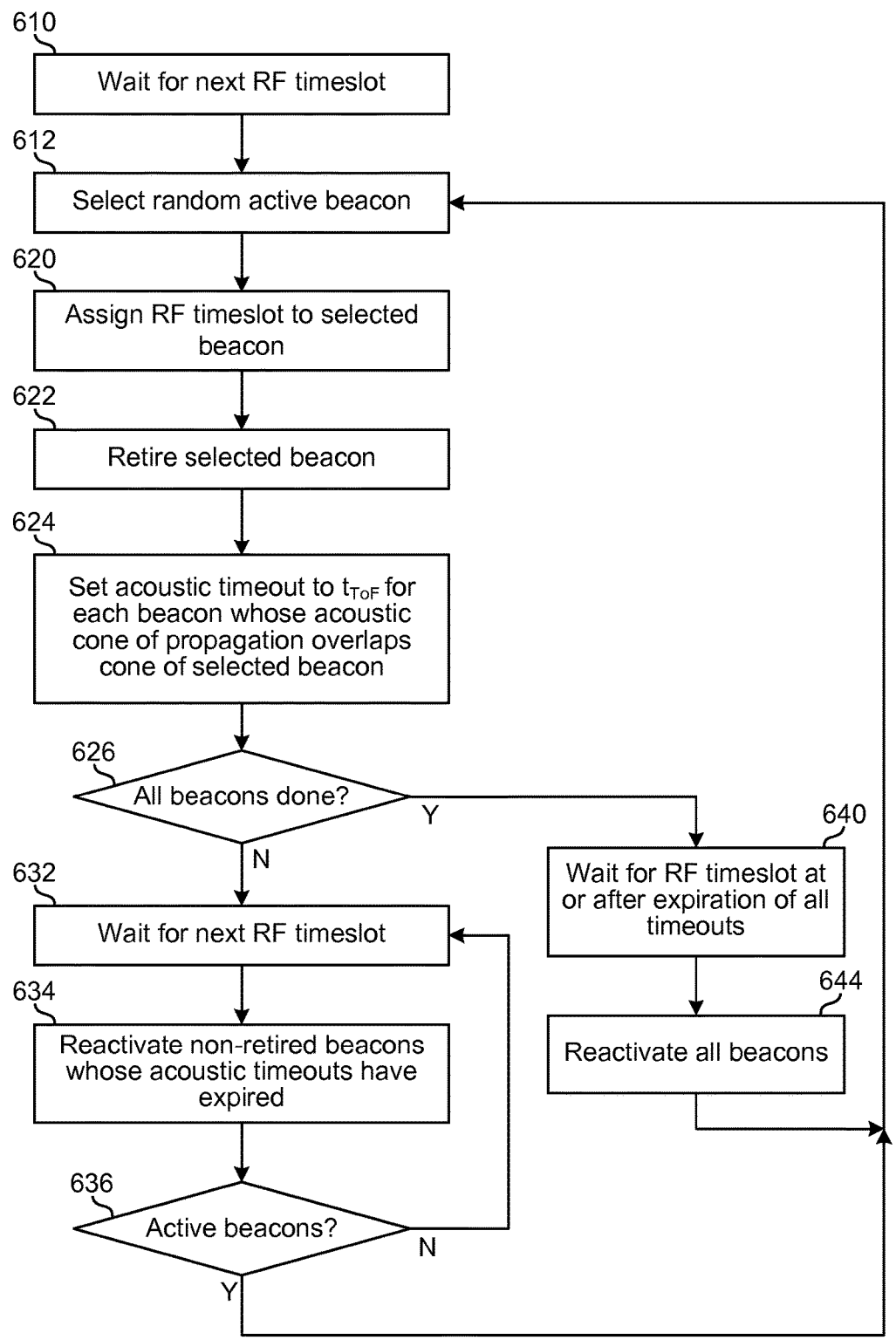

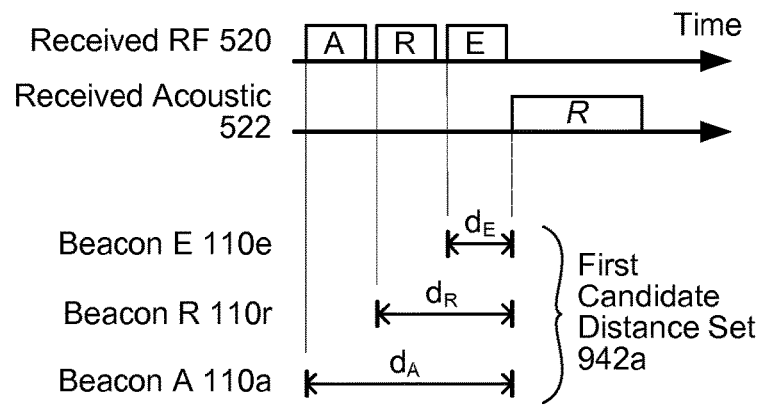
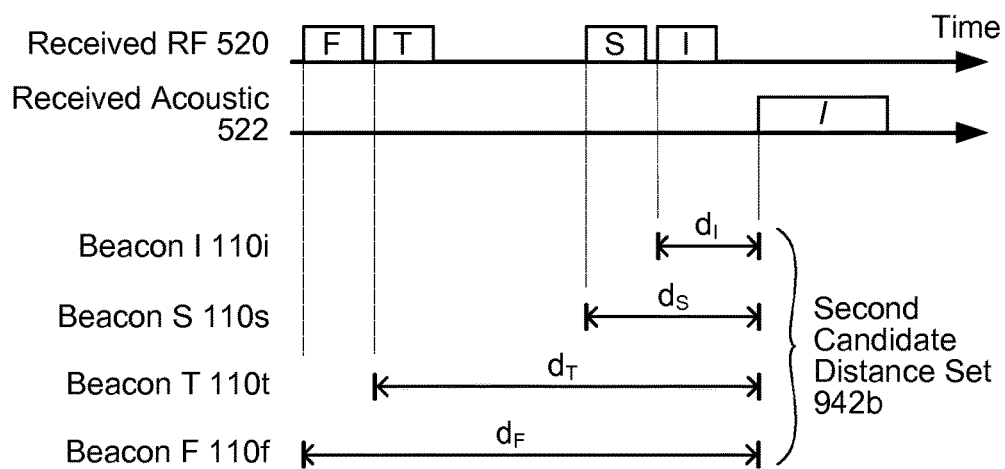

GEOMETRICAL SCHEDULING ALGORITHM FOR ACOUSTIC POSITIONING BEACONS

BACKGROUND

Indoors, location technologies such as GPS (Global Positioning System) may not work, or may be too slow and inaccurate to be useful for navigation. Other technologies are being developed and deployed to assist with indoor navigation, including radio-based and acoustic-based solutions.

BRIEF DESCRIPTION OF DRAWINGS

For a more complete understanding of the present disclosure, reference is now made to the following description taken in conjunction with the accompanying drawings.

FIGS. 6A to 6C illustrate examples of processes for centrally controlling operation of the beacons of the system.

FIGS. 9A to 9D illustrate timing diagrams of a first, second, third, and fourth sets of candidate distances based on TDOA calculations.

DETAILED DESCRIPTION

Figure 1:
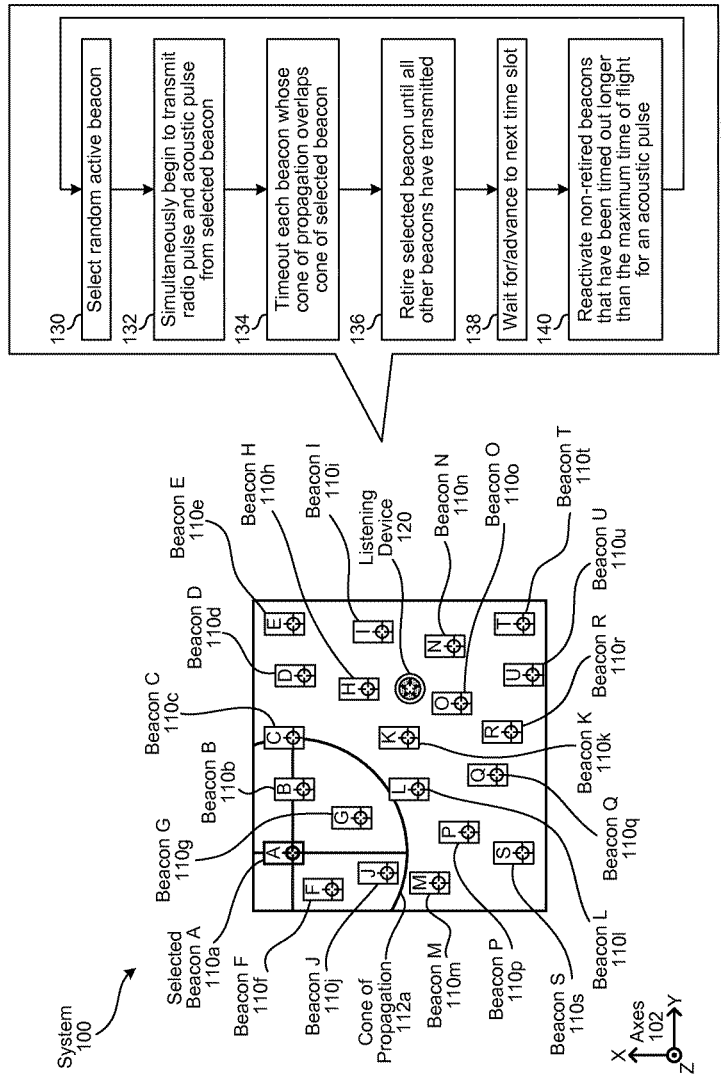
FIG. 1 is an overview of a system for scheduling signal transmissions by beacons in a time difference of arrival (TDOA) system.

One example of an indoor navigation solution is the Cricket Indoor Location System developed by the Massachusetts Institute of Technology. Cricket uses a set of ceiling-mounted "beacons" which each periodically broadcast location information in a radio frequency (RF) pulse containing a message, and also emit an ultrasonic pulse. Based on the difference in time-difference-of-arrival (TDOA) between the RF and ultrasonic pulses, a listening device may determine its distance to the beacon. By collecting the beacon location information for multiple beacons and calculating distances to those beacons, a listening device can triangulate its own position.

Cricket uses an active-beacon/passive-listener architecture. A virtue of having passive listeners is that the system is scalable with respect to the number of listening devices (i.e., receivers), making system performance independent of the number of listeners in an environment. Also, since the listening devices are not tracked by the system, the privacy of users of the listening devices is protected.

Each active beacon periodically transmits a radio frequency (RF) pulse containing a message including beacon-specific information, such as a unique beacon identifier ("beacon ID"), the beacon's spatial coordinates (e.g., geographic coordinates, Cartesian coordinates, etc.), and information identifying the physical space associated with the beacon (e.g., a room identifier). The beacon begins transmission of an ultrasonic pulse simultaneously with transmission of the RF pulse. The duration of the ultrasonic pulse is longer than the RF pulse, but the ultrasonic pulse does not ordinarily carry any beacon-identifying nor coordinate information. A listening device can determine its own location to within a few centimeters by triangulating its position based on the spatial coordinates included in the RF pulses of three or more beacons and the calculated TDOA distances to those beacons.

A problem that occurs with the Cricket system is that if beacon transmissions are uncoordinated, a listening device may receive multiple RF pulse transmissions in succession, followed by the ultrasonic pulses, with no way to determine which ultrasonic pulse originated with which beacon. Solutions to this problem have been based on use of distributed scheduling to control when beacons transmit, including having each beacon sense whether another beacon is transmitting (RF carrier sensing) before transmitting themselves, timing out if another beacon's transmission is detected, and randomizing transmission times (thereby reducing chances of concurrent beaconing). A similar decentralized scheduling scheme has been used with Ethernet, where the coordination strategy is commonly known as "carrier sense multiple access with collision detection" (CSMA/CD). Another solution for scheduling Cricket beacons is to use time-division-multiple-access (TDMA), where each beacon is assigned a different time to transmit.

In Cricket, as in Ethernet, implementation of distributed scheduling must accommodate a lack of centralized transmission coordination, and the scalability issues that arise as the number of transmitters increases. Using CSMA/CD and/or TDMA, the beacons transmit one after another serially, waiting a sufficient time to allow a prior beacon's acoustic pulse to fade before transmitting the next RF/acoustic beaconing pulses. This acoustic-serial implementation assures that a received acoustic pulse is readily associated with a received RF pulse, but it slows system performance in large-scale beacon deployments.

Scaling the infrastructure for real-world commercial deployments, a 10,000 square foot datacenter might require hundreds of beacons for listening devices to track themselves throughout the datacenter. In any given region of the datacenter, beacons may wind up waiting multiple seconds for other beacons to complete their transmissions before transmitting themselves. The result is that listening devices in the region may not have location updates for multiple seconds, resulting in poor tracking performance.

One solution to improve scalability would be to use multiple ultrasonic/acoustic frequencies to better differentiate beacons. Another solution would be to encode data over the ultrasonic/acoustic channel to provide indicia associating the acoustic channel with the corresponding RF pulse originating from a same beacon. However, on their own, these solutions have inherent limitations since the number of acoustic channels and the amount of data encodable over each channel is limited by the abilities of hardware, such as the ability of the speakers/transducers used by the beacons to transmit such signals and the ability of the microphones used by the listening devices to capture such signals. Encoding data over the acoustic channel is further complicated by multiple acoustic reflections of a same acoustic pulse potentially being received at the listening device out-of-phase, creating interference that can corrupt encoded data. While such shortcomings can be overcome, they increase the audio processing complexity and computational load placed on the listening devices, necessitating a more expensive processor and reducing listening device battery life.

FIG. 1 illustrates an improved active-beacon/passive-listener TDOA system 100. The system architecture may operate without encoding data over the ultrasonic/acoustic channel and without using multiple such channels. The system 100 uses an algorithm that takes in the geometry of the beacons 110 as input, and produces a schedule for the beacons 110 to transmit that permits multiple beacons to transmit acoustic pulses whose propagation overlap in time. A listening device may receive multiple RF pulses prior to receiving an acoustic pulse, and after having received as few as two acoustic pulses, may determine a single unique "solution" as to which RF pulses match which acoustic pulses. Beacon serialization may be avoided and scalability is increased. Beacons may be scheduled by a central controller implementing the algorithm to directly control each beacon or by pre-loading each beacon with a schedule instructing the beacon when to transmit. Beacons may also implement the scheduling algorithm autonomously.

The scheduling algorithm selects (130) a random "active" beacon. Beacons may have four statuses: "active selected" (a beacon selected to transmit RF and acoustic pulses), "active unselected" (a beacon available for selection), "timed-out" (a beacon that has not yet been selected in the current cycle of the schedule and is temporarily inactive), and "retired" (a beacon that has already been selected in the current cycle of the schedule that is inactive until the next cycle of the schedule). Initially, at the start of each cycle, all beacons are active.

A "timed-out" beacon is prohibited from transmitting its RF and acoustic pulses for the duration of its time out period. A "retired" beacon, having already transmitted its RF and acoustic pulses, will not transmit again until the next cycle of the scheduling algorithm which begins after every other beacon with an RF range that overlaps the RF range of the retired beacon has broadcast its pulses in the current cycle. As will be described further below, autonomously self-scheduling beacons may continuously monitor RF transmissions to detect the RF pulses from other beacons for scheduling purposes even when they are "inactive" (i.e., timed-out or retired).

Whether the RF range of one beacon overlaps the RF range of another beacon may be determined based on whether a location exists where a listening device in the system might be able to detect RF pulses from both beacons. Similarly, whether the acoustic range of one beacon overlaps the acoustic range of another beacon may be determined based on whether a location exists where a listening device in the system might be able to detect acoustic pulses from both beacons.

Figure 2:
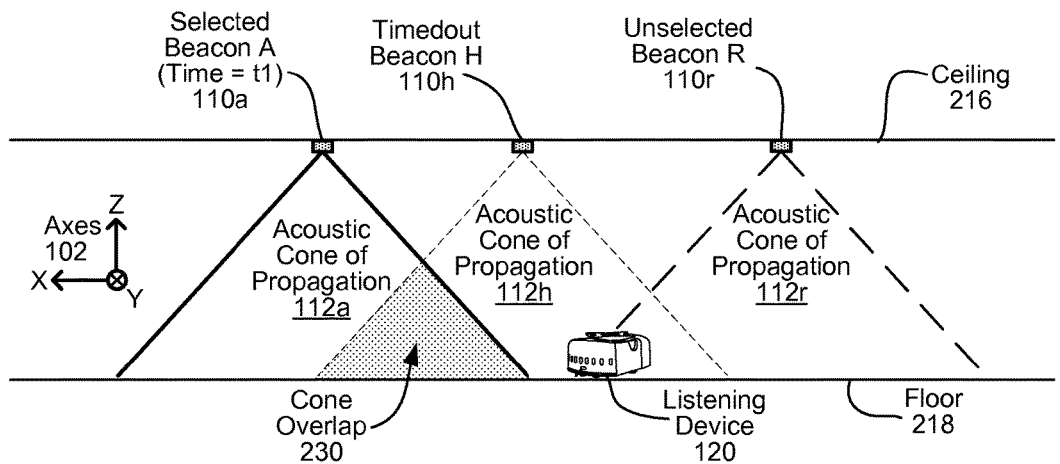
FIG. 2 is a side view illustrating an arrangement of three beacons in operation in the system.
Figure 3:
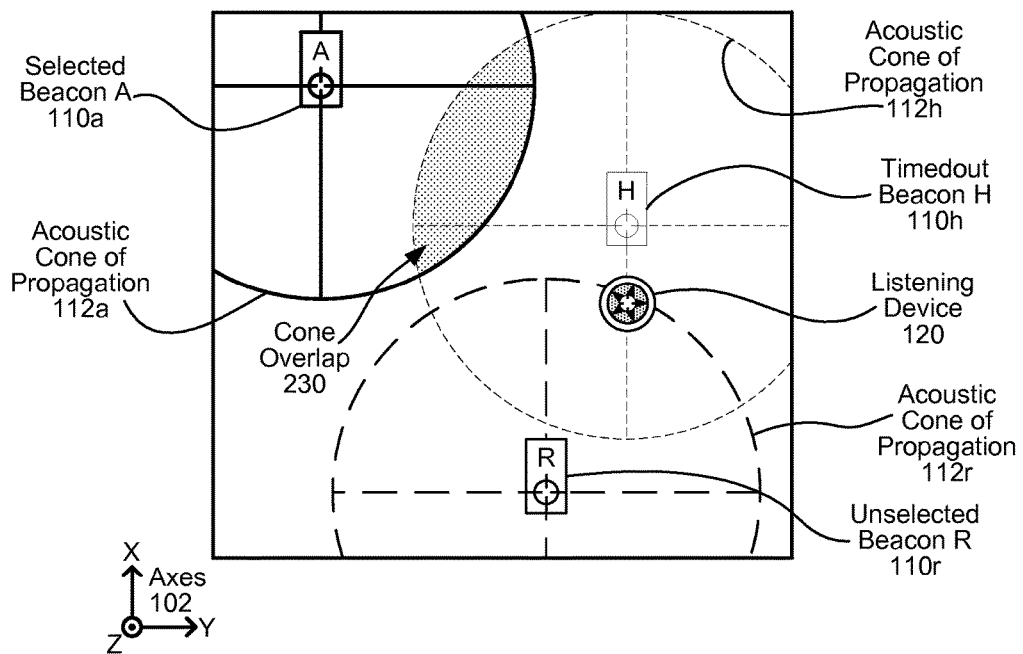
FIG. 3 is an overhead map view further illustrating operation of the three beacons of the arrangement in FIG. 2.

In the example in FIG. 1, the first selected beacon is Beacon A 110a, which has an acoustic cone of propagation 112a. This is further illustrated in FIGS. 2 and 3, which focus on three beacons in the system 100 to demonstrate spatial relationships between a selected beacon, a timed-out beacon, and an active unselected beacon. Each beacon has a defined acoustic cone of propagation 112, which delineates the distance an acoustic pulse may travel from the beacon (ordinarily mounted on the ceiling 216) and still have sufficient magnitude/amplitude to be detected by a listening device 120 (e.g., close to the floor 218, as illustrated in FIG. 2).

The ranges of cones of propagation may be mapped by sampling to account for room acoustics to allow for more precise approximation, but for the purposes of demonstrating the system architecture, a simple cone is used, with every beacon having a same cone radius. For example, sampling may be used to determine the maximum distance from each beacon where an acoustic pulse from the respective beacon transitions from being detectable to not being detectable, and the longest/furthest maximum distance may be set as the range/radius of each cone of propagation. A set of Cartesian axes 102 are included in the figures to illustrate relative orientations there between.

The selected beacon 110a simultaneously begins transmission (132) of an RF pulse and an acoustic pulse. The scheduling algorithm times out (134) each beacon whose acoustic cone of propagation 112 overlaps (e.g., cone overlap 230 in FIGS. 2 and 3) the acoustic cone of propagation of the selected beacon. A timed-out beacon is prohibited from transmitting its own RF and acoustic pulses until after its time-out period expires. If in a later iteration of the beacon selection algorithm another beacon is selected whose cone of propagation overlaps with that of a timed-out beacon, the timed-out beacon's time-out period starts over (i.e., is renewed).

The acoustic pulse may be ultrasonic or audible, and unless expressly stated otherwise, the terms "ultrasonic," "acoustic," and "audible" pulses may be used interchangeably herein, since even though ultrasound has advantages (e.g., component cost, propagation properties, less susceptibility to interference due to ambient noise, shorter wavelength facilitating shorter pulses), any frequency of sound that will propagate in the medium (e.g., air) between the beacon 110 and the listening device 120 may be used—e.g., infrasonic (below 20 Hz), acoustic (between 20 Hz and 20 kHz), or ultrasonic (above 20 kHz).

The status of the selected beacon is changed (136) from "active selected" to "retired." Having transmitted its pulses, the beacon will remain retired until after all the other beacons having RF-range overlap with the retired beacon have been selected. The system 100 waits 138 for a next available RF timeslot (or advances to the next time slot if pre-calculating a schedule). While multiple acoustic pulses may be propagating simultaneously, only one RF pulse is propagating from beacons that have overlapping RF propagation ranges (which may be modelled as cones, spheres, etc.) at a time, using time division multiplexing (TDM) timeslots. With the next timeslot, the schedule reactivates (140) all of the non-retired beacons that have been timed out longer than the maximum time of flight ($t_{TOF}$) for an acoustic pulse in the environment.

The maximum time of flight ($t_{TOF}$) of an acoustic pulse is a predetermined value for the system 100 based on the longest duration any acoustic pulse can be detected by a listening device in the system. The value depends on the magnitude/amplitude of the acoustic pulses emitted by each beacon 110, the distance between a receiver (e.g., a listening device) and the emitting beacon, the acoustic-reception sensitivity of the listening devices 120, a detection threshold of a filter used by a listening device to reject weak acoustic signals (e.g., classifying a received acoustic pulse as "detected" only while the pulse's magnitude is above the threshold), and the ambient acoustics of the environment.

The maximum time of flight ($t_{TOF}$) of an acoustic pulse is a predetermined value for the system 100 because during normal operation, beacons will receive no feedback from the listening devices indicating whether a pulse was or was not received. The value may be selected based on the anticipated or pre-measured sensitivities of listening devices to be used in the system, and/or a receiver sensitivity value may be periodically broadcast (e.g., in an RF pulse between cycles of the beacons) instructing listening devices to set their detection sensitivity to a particular value. If the receiver sensitivity value is periodically broadcast, all the beacons in the system may be instructed to simultaneously emit an acoustic pulse, allowing each listening device to use the magnitude of the first received acoustic pulse to calibrate its own detection sensitivity, with the next cycle beginning after the maximum time of flight $t_{TOF}$.

The microphone(s) on each listening device 120 has a particular sensitivity, and an acoustic pulse received by the microphone(s) is input into the detection threshold filter. When a signal magnitude of a received incoming acoustic pulse exceeds the threshold of the filter, the acoustic pulse is "detected" by the listening device. When the signal magnitude of the received incoming pulse falls below this cutoff threshold of the filter, the pulse is no longer "detected" by the listening device 120 (e.g., even if picked up by a microphone of a listening device, the acoustic pulse is rejected as too weak and not used for TDOA processing). The threshold of the filter may be a tunable value (e.g., an adjustment made in hardware or software), and may be preset on each listening device and/or set in accordance with system calibration parameters. The maximum time of flight $t_{TOF}$ for a system 100 is the largest sum of the time it takes for a pulse to travel to any arbitrary location in the system, and the time it takes for the pulse to decay below a listening device's detection cutoff threshold at that location.

An error margin may be added into the maximum time of flight $t_{TOF}$ to prevent the possibility that the combination of fading pulses from two different beacons could possibly be detected in-phase by a listening device as an acoustic pulse, even though the magnitude of each individual signal is below the listening device's detection cutoff threshold (e.g., two acoustic pulses combining at a point in space to have the characteristics of one pulse of greater magnitude than either pulse possesses individually).

In some ambient environments, an echo of an acoustic pulse may have sufficient magnitude to be above the pulse-detection threshold of the filter of a listening device. To reduce or eliminate this potential problem, listening devices may be configured to differentiate between an acoustic pulse and the echoes (reflections) of the acoustic pulse. Most any echo discrimination technique may be used. For example, a listening device may use multiple microphones together with an acoustic source localization echo discrimination technique (e.g., comparing the amplitude and phase of sound waves received on multiple microphones to distinguish between a main pulse and its echo). Another example of an echo discrimination technique that a listening device may include is time-domain cue detection, which detects time-separation pitch, rise time, and duration differences to differentiate the main pulse from its echo (an echo discrimination technique most commonly used with SONAR). However, if the listening devices are not configured to differentiate between an incoming acoustic pulse and that pulse's echoes, this problem can be addressed by lengthening the duration of the acoustic pulses, and/or by increasing the maximum time of flight of an acoustic pulse $t_{TOF}$ to include the time needed for both an acoustic pulse and its echoes to die down, such that secondary reflections from an acoustic pulse are provided sufficient time to fall below the filter's detection threshold within the maximum time of flight duration.

As will be described further below, each listening device 120 may receive multiple RF pulses prior to receiving an acoustic pulse. The listening device 120 determines which of the preceding RF pulse matches the acoustic pulse using combinatorial techniques. By timing-out beacons for the maximum time of flight ($t_{TOF}$) of an acoustic pulse if the beacon's acoustic cone of propagation overlaps a selected beacon's acoustic cone, the listening device 120 will never receive more than one acoustic pulse at a time without regard to the listening device's location—even though there may be multiple acoustic pulses propagating within the system 100 at a same time. As a result, the scheduling algorithm is scalable to deployments with a very large number of beacons. Since multiple acoustic pulses may be propagating simultaneously, the scheduling algorithm can rapidly cycle through all the beacons, providing the listening device with rapid updates.

The number of RF pulses that a listening device 120 may receive prior to an acoustic pulse varies based on the listening device's location in the system 100 and the selection scheduling of nearby beacons (which may be random). The upper limit on the number of RF pulses per acoustic pulse depends on, among other things, the time difference between the duration of a time division multiplexing (TDM) timeslot afforded to each RF pulse and the maximum time of flight of an acoustic pulse $t_{TOF}$. This difference impacts how many RF timeslots correspond to the duration that a beacon will remain timed-out, and therefore directly affects the probability of when a beacon proximate to a listening device 120 will transmit.

If a listening device does not discriminate between a main acoustic pulse and that pulse's echoes, and an echo has sufficient magnitude and duration to be detected as a discrete pulse by the receiver of the listening device (i.e., received as a separate pulse after the main acoustic pulse and being received at a magnitude above the receiver's detection filter threshold), and the listening device attempts to pair the echo with an RF pulse, then the time difference of arrival calculations performed by the listening device may fail. Whether this is an issue in a particular system depends upon (among other things) the duration of each acoustic pulse, the maximum magnitude of an echo in the system, and the acoustic pulse-detection filter threshold of each receiver. Lengthening the duration of the acoustic pulses to overlap with its own echoes can eliminate this problem by assuring that echoes of any consequential magnitude will not be discrete from the main pulse. Another echo mitigation solution to reduce and/or eliminate the false detection of echoes as acoustic pulses (for TDOA purposes) is to reduce each listening device's filter detection threshold below the maximum magnitude that an echo in the system may have without overlapping the main acoustic pulse, and/or to reduce the magnitude of each acoustic pulse emitted by the beacons so that a maximum magnitude that an echo in the system may have without overlapping the main acoustic pulse will be below each receiver filter detection threshold.

A system-timing benefit if each listening device performs echo discrimination to ignore acoustic echoes is that shorter-duration acoustic pulses may be used, thereby reducing the maximum time of flight ($t_{TOF}$) of an acoustic pulse and the corresponding beacon time-out durations. Reducing $t_{TOF}$ speeds up how quickly beacons may broadcast in succession, thereby reducing the average time each listening device will need to identify its own location. Speeding up how quickly beacons broadcast in succession also reduces the average number of combinatorial computations a listening device may need to perform to pair an RF pulse with an acoustic pulse by reducing the average number of RF pulses received per acoustic pulse.

Modifications to the architecture may be made to further decrease the time it takes to cycle through all the beacons. For the purpose of demonstration, the example in FIG. 1 assumes that all beacons are within RF range of each other, such that only one RF pulse is to be transmitted at a time, using a timeslot sequencing scheme such as time division multiple access (TDMA). As described further below, if some beacons have RF detectability ranges (e.g., cones of propagation) that do not overlap, more complex scheduling is possible by accounting for the RF detectability ranges of each beacon, using the same principles as the architecture used for acoustic to schedule overlapping RF pulses. Also, if instead of TDMA, an RF multiplexing technique such as code division multiple access (CDMA) is used, multiple RF pulse could be transmitted simultaneously (each with a different code).

Also, while all the acoustic pulses are identical in the examples, multiple different acoustic frequencies might be used to further increase the speed of a cycle through all of the beacons. In such an implementation, the maximum time of flight of an acoustic pulse $t_{TOF}$ for each acoustic frequency might be different (due to differences in propagation characteristics). Beacon timeouts would be specific to an acoustic frequency, such that a beacon might have different time out durations at each frequency, and might be active in one frequency while timed out in another. When a beacon 112 transmits its RF pulse, in addition to the unique identifier, timestamp, geographic coordinates, and location identifier (e.g., room identifier), the beacon's RF pulse would also indicate which acoustic frequency it broadcast on, allowing a listening device 120 to pair received RF pulses with the corresponding received acoustic pulse of the identified frequency.

Figure 4A:
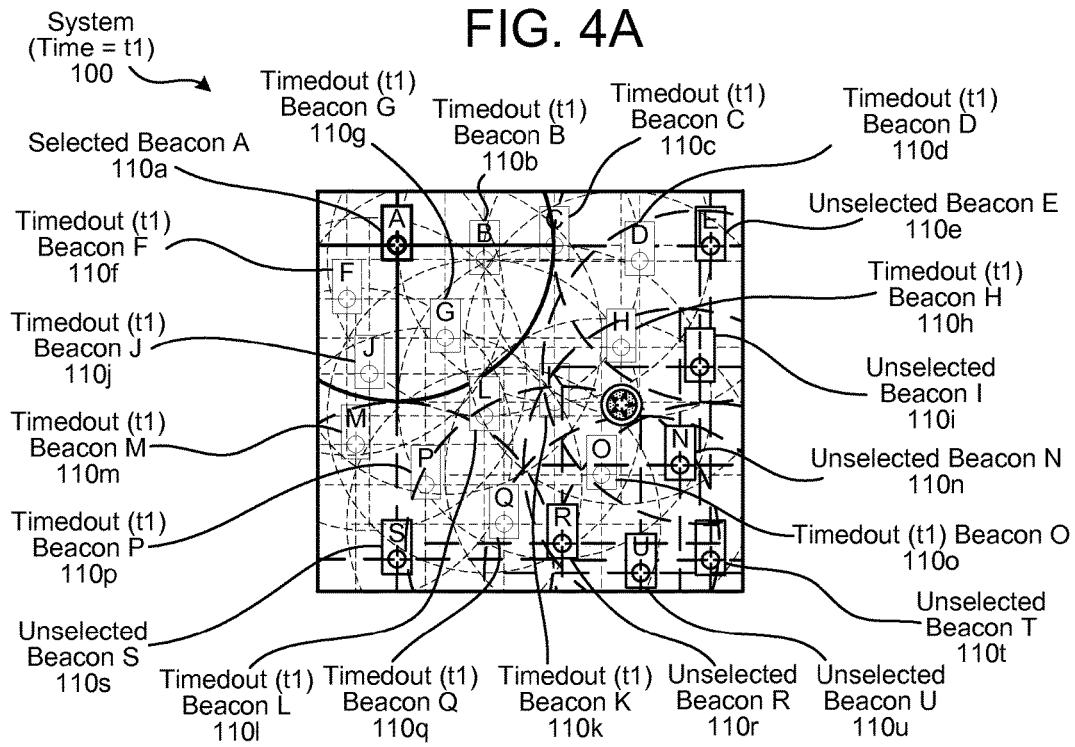
FIGS. 4A to 4N are overhead map views illustrating operation of the system over time.

FIG. 4A-4N are overhead maps of the example beacon deployment from FIG. 1, cycling through several iterations of the scheduling algorithm. In FIG. 4A, for the first RF timeslot t1, Beacon A 110a is selected. As a result, Beacons B, C, D, F, G, H, J, K, L, M, O, P, and Q are timed out (i.e., temporarily inactive), as their acoustic cones of propagation 112 overlapped with that of selected Beacon A. Beacons E, I, N, R, S, T, and U remain active and available for selection.

Figure 4B:
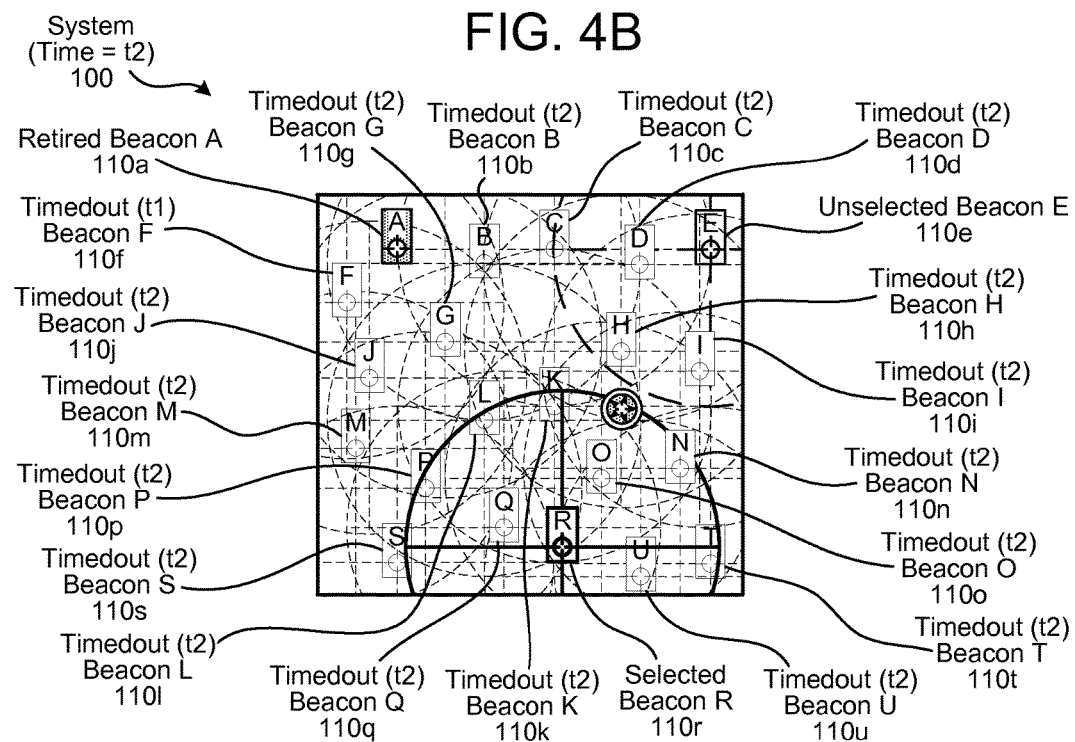

In FIG. 4B, for the second RF timeslot t2, Beacon R 110r is selected. As a result, Beacons I, N, S, T, and U are timed out, and the timeouts on Beacons B, C, D, G, H, J, K, L, M, O, P, and Q are extended based on their acoustic cone of propagation 112 overlapping with that of Beacon R. Beacon E 110e remains available for selection. Beacon A 110a is retired (i.e., inactive) until the next scheduling cycle after all other beacons have transmitted.

Figure 4C:
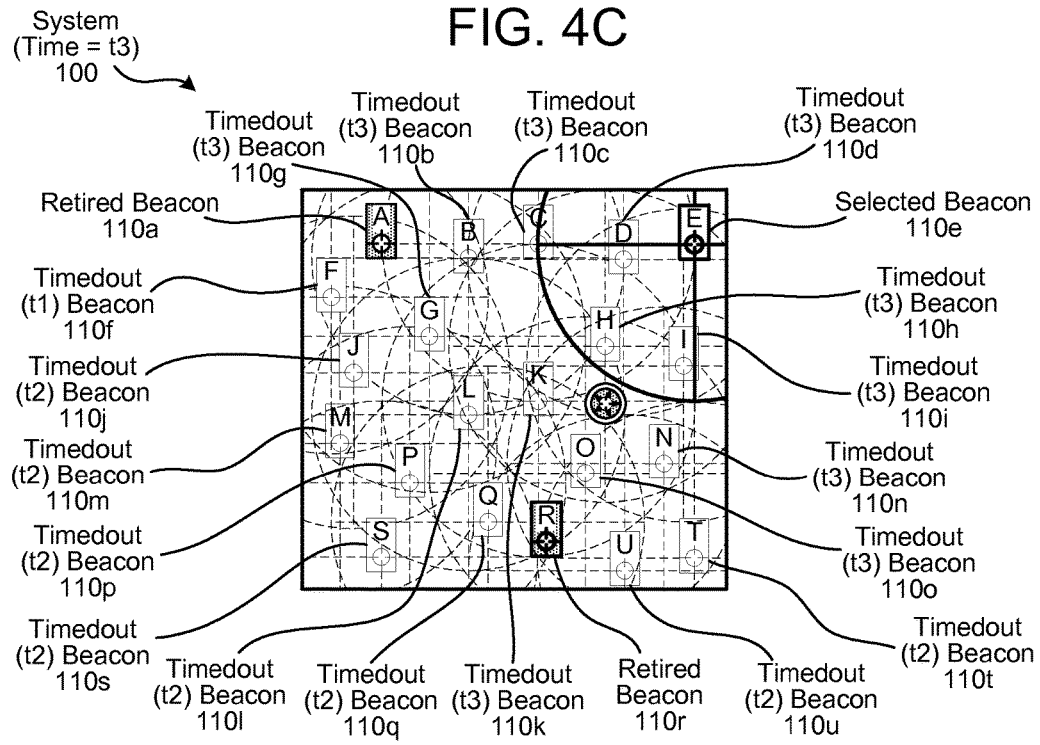

In FIG. 4C, for the third RF timeslot t3, Beacon E 110e is selected. As a result, the timeouts on Beacons B, C, D, G, H, I, K, N, and O are extended based on overlap with Beacon E. Beacons A 110a and R 110r are retired.

Figure 4D:
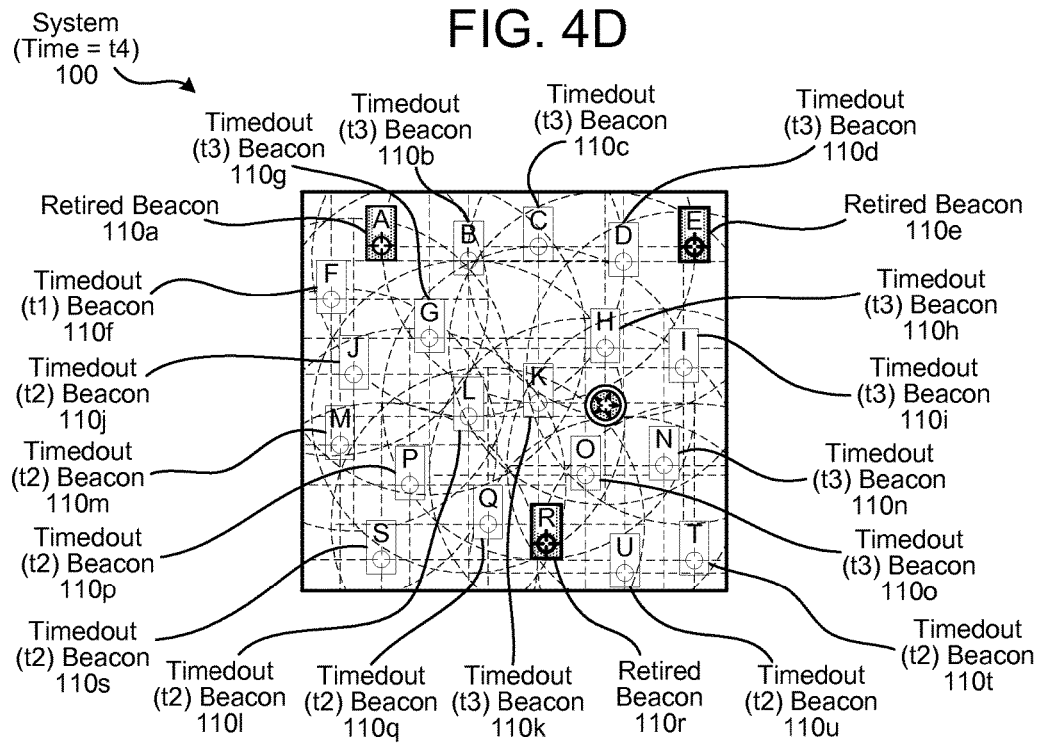
Figure 4E:
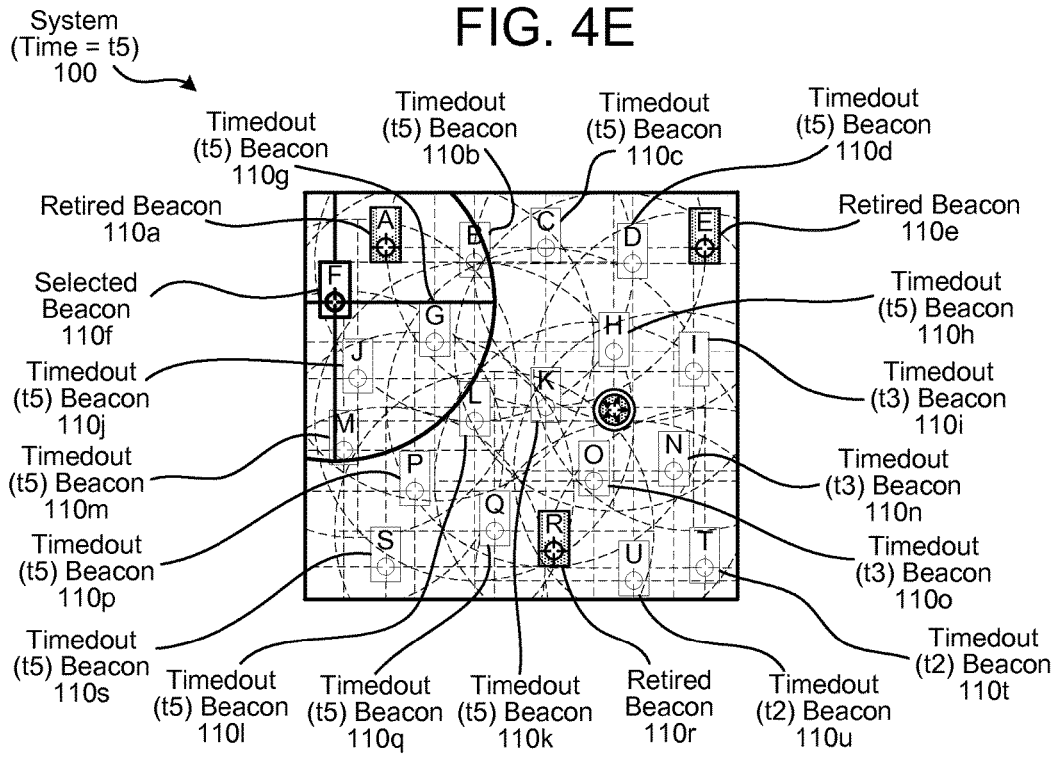

In the example in FIGS. 4A to 4N, the maximum time of flight of an acoustic pulse ($t_{TOF}$) is equivalent to a time between four and five RF timeslots. As described above, the value of $t_{TOF}$ is system-dependent, such that this duration is merely an example. In FIG. 4D, during the fourth RF timeslot t4, all the beacons are either retired or remain timed-out, such that no beacon is available for selection. However, between the fourth timeslot t4 and the fifth timeslot t5, the timeout expires on Beacon F 110f. In FIG. 4E, Beacon F 110f is selected for the fifth timeslot t5, and beacons with overlapping cones are timed out accordingly.

Figure 4F:
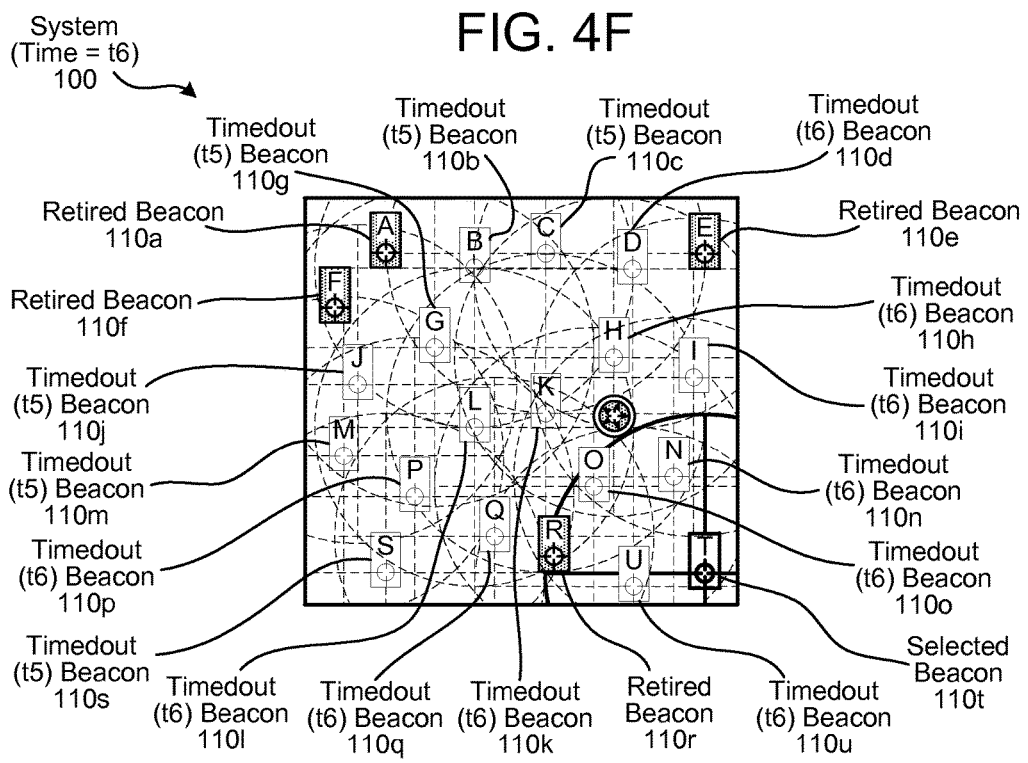
Figure 4G:
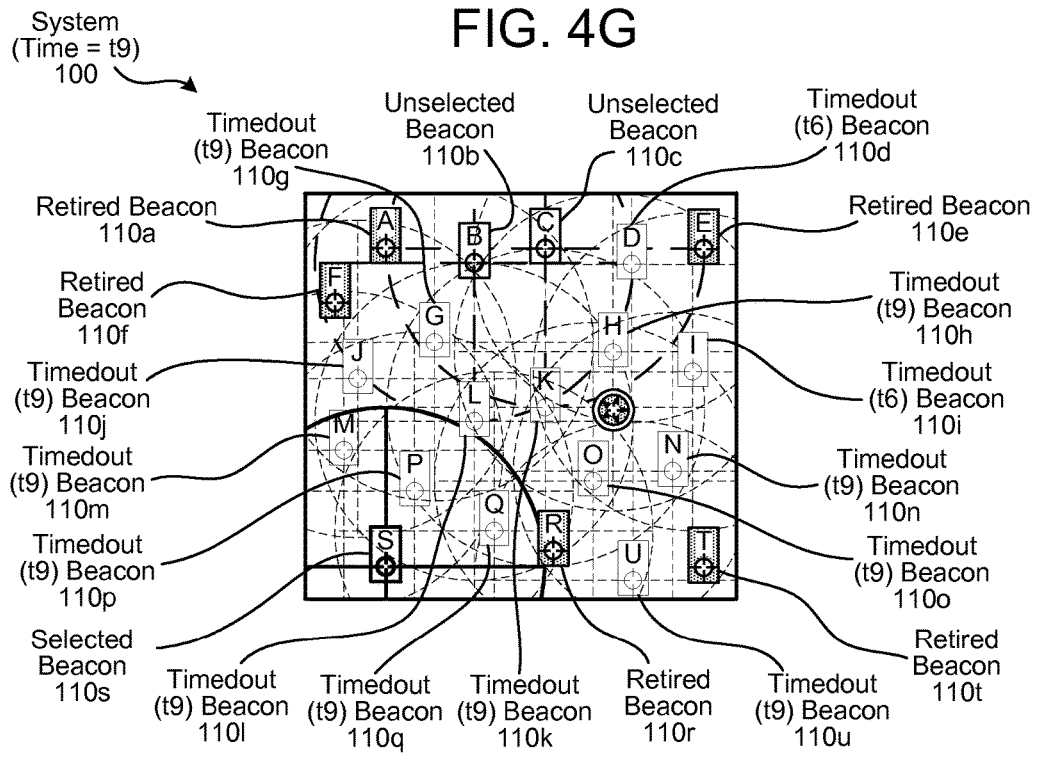

Between the fifth and sixth RF timeslots, the timeouts expire on Beacons T 110t and U 110u. In FIG. 4F, for the sixth RF timeslot t6, Beacon T 110t is selected, and beacons with acoustic cones that overlap that of Beacon T are timed out accordingly. All non-retired beacons remain timed out for the seventh and eighth RF timeslots, with the timeouts on Beacons B, C, G, J, M, and S expiring between the eighth and ninth RF timeslots. In FIG. 4G, Beacon S 110s is selected, and beacons with acoustic cones of propagation 112 overlapping that of Beacon S are timed out accordingly. Beacons B and C remain active and unselected.

Figure 4H:
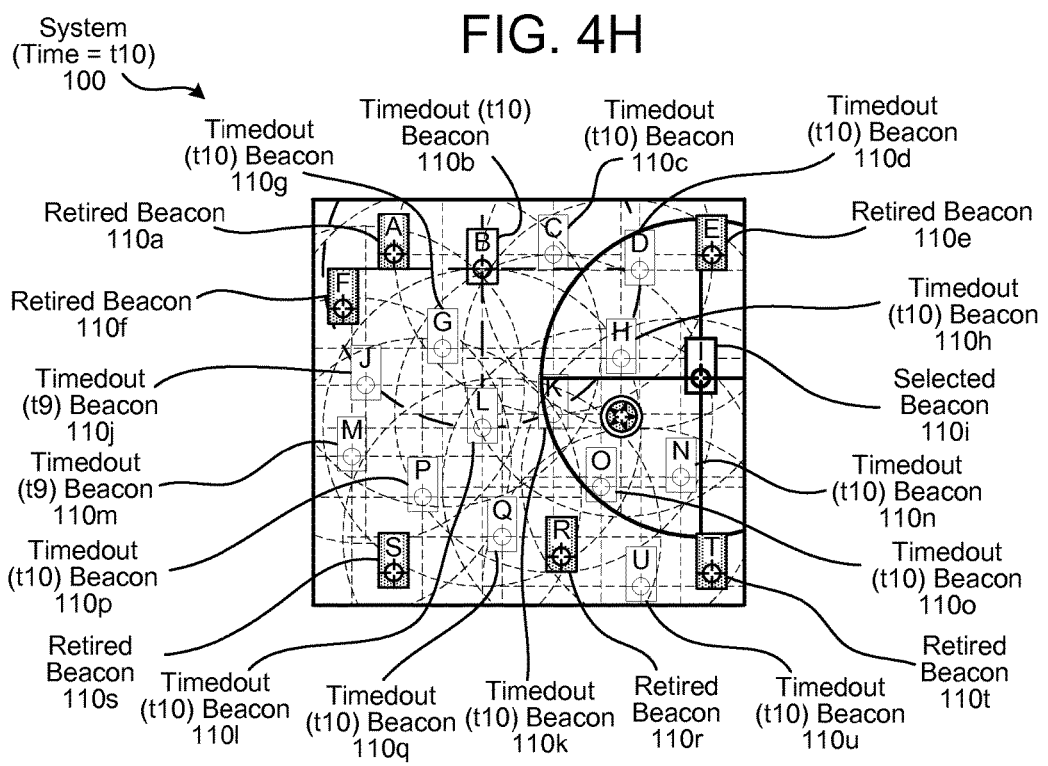

Between the ninth and the tenth timeslots, the time outs on Beacons D and I expire, such that Beacons B, C, D, and I are active. In FIG. 4H, Beacon I 110i is selected, and beacons with 112 acoustic cones of propagation overlapping that of Beacon I are timed out accordingly. All non-retired beacons remain timed out for the eleventh and twelfth RF timeslots. Between the twelfth and thirteenth RF timeslots, the timeouts on Beacons J and M expire. In FIG. 4I, Beacon M 110m is selected for the thirteenth timeslot t13, and beacons with acoustic cones of propagation 112 overlapping that of Beacon M are timed out accordingly.

Between the thirteen and fourteenth RF timeslots, the time outs on Beacons D, N, and U expire. In FIG. 4J, Beacon N 110n selected for the fourteenth RF timeslot t14, and beacons with acoustic cones or propagation 112 overlapping that of Beacon N are timed out accordingly. FIGS. K through N illustrate four more iterations, with all beacons timed out during RF time slots t15, t16, t19, t20, t22, t23, and t24.

Figure 5A:
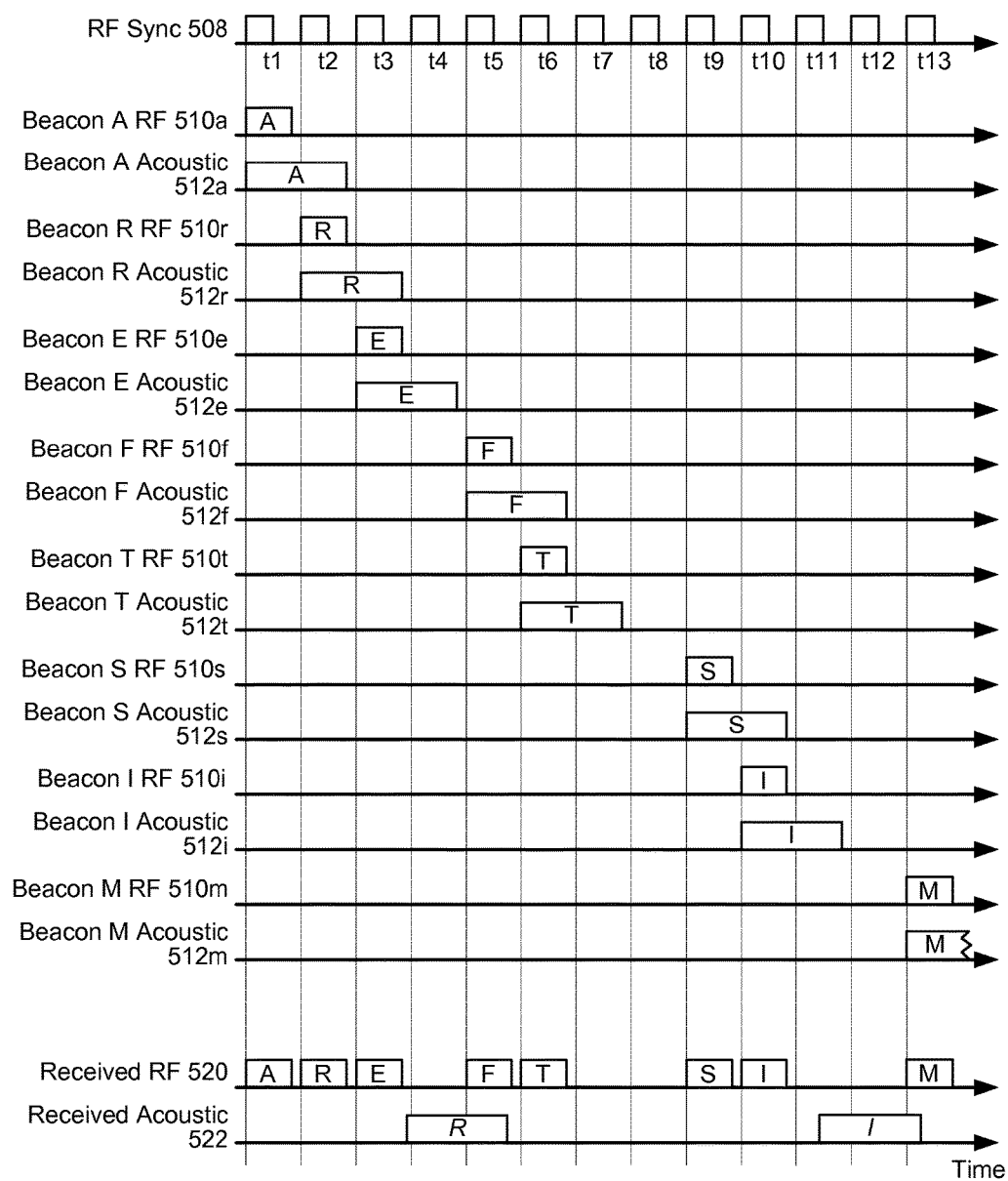
FIGS. 5A and 5B are timing diagrams illustrating RF and acoustic transmissions by the beacons, and reception at an example listening device.
Figure 5B:
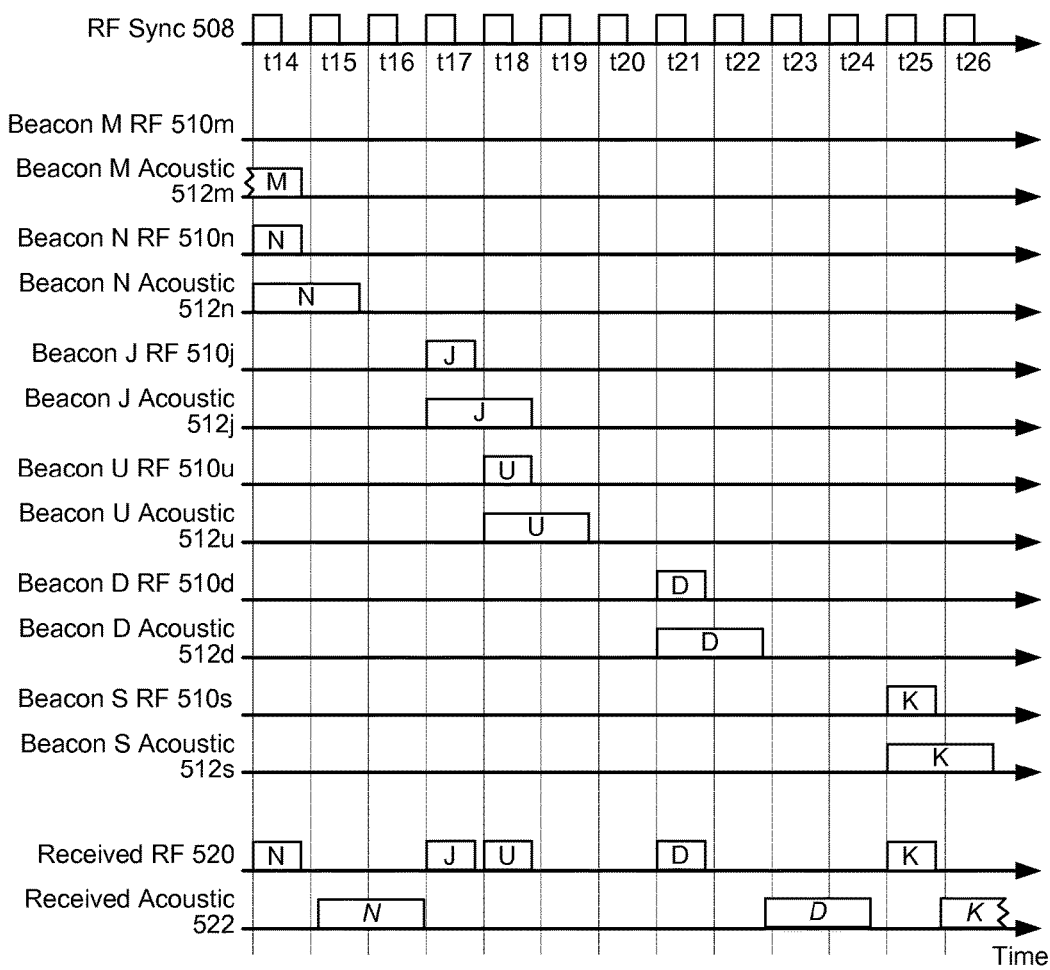

FIGS. 5A and 5B illustrate timing diagrams for the beacons selected in FIGS. 4A through 4N. Each respective selected beacon simultaneously initiates transmission (510) of an RF pulse and transmission (512) of an acoustic pulse. The length of the acoustic pulse is longer than that of the RF pulse, but the illustrated relative lengths of each of the RF and acoustic pulses in FIGS. 5A and 5B are examples and not drawn to scale.

FIGS. 5A and 5B also illustrate the RF synchronization timing 508 that is used to synchronize the beacons and may be used to govern the timing of the RF timeslots. The RF synchronization signal may comprise a transmitted signal and/or may be maintained on the individual beacons. Time-dependent asynchronous operation is also possible, with an autonomous beacon determining to transmit its RF pulse based on an RF pulse from the prior beacon ending. In both synchronous and asynchronous operation, timeouts expire based on the specified time-out duration having transpired (e.g., a countdown time, a count-up timer, based up the actual time, etc.), as determined by the scheduler (e.g., a central controller), as specified in a distributed schedule, and/or as determined by an individual beacon (e.g., in a system where the beacons are autonomous).

FIGS. 5A and 5B also illustrate the relative timing of when an example listening device 120 receives (520) the RF pulses, and receives (522) the acoustic pulses originating from beacons within range. The delay in receiving the acoustic pulses after receiving the RF pulses is used by the listening device to determine the time difference of arrival (TDOA). Although the received acoustic pulses 522 are labelled in FIGS. 5A and 5B with the identifier of the originating beacon for the purpose of explanation, the listening device 120 itself does not know the origin of the acoustic pulses, as the acoustic pulses do not include an origin identifier (in comparison to each RF pulse, which includes an identifier such as a beacon ID).

TDOA systems measure the distance between two points using signals with different speeds that traverse the same path between two points. If a transmitter simultaneously broadcasts a first signal at a velocity $v_1$ and a second signal at a velocity $v_2$, a receiver can calculate its distance d from the transmitter according to:

$$d = \frac{t}{\frac{1}{v_1} - \frac{1}{v_2}} \quad [1]$$

where t is the difference in time of arrival between the two signals at the receiver.

The speed of sound in dry air at a temperature of 20° Celsius (68° Fahrenheit) is approximately 343.2 meters per second. In comparison, a radio frequency (RF) signal travels at the speed of light, which is approximately $3 \times 10^8$ meters per second. Given the large difference between the speed of sound and the speed of light, the reciprocal of the speed of light can be approximated as zero, in which case equation [1] can be expressed as:

$$d \approx t \cdot v_{Sound} \quad [2]$$

where $v_{Sound}$ is the speed of sound in the ambient (e.g., 343.2 meters per second). Thus, the distance from the transmitter is approximately proportional to the time difference of arrival (the "approximate" being due to eliminating the miniscule contribution of the speed of light to the result in equation [1]).

Referring to FIGS. 5A and 5B, and as will be explained further below, the listening device 120 may calculate the TDOA difference for each RF pulse preceding an acoustic pulse. So for example, the listening device 120 may calculate the TDOA difference from the start of the received RF pulse from Beacon A to the start of the received acoustic pulse (from Beacon R), the difference from the start of the received RF pulse from Beacon R to the start of the received acoustic pulse (from Beacon R), and the difference from the start of the received RF pulse from Beacon E to the start of the received acoustic pulse (from Beacon R), not knowing which RF pulse received prior to the acoustic pulse goes with the acoustic pulse. An exception to this is if a single RF pulse is received prior to the acoustic pulse, in which case the listening device 120 may determine that there is an immediate match. How each listening device 120 resolves the many-to-one problem will be explained further below.

FIG. 6A illustrates an example of the scheduling algorithm implemented by a central controller that actively controls the beacons 110. In a centrally controlled implementation, individual beacons are slaved to the central controller that may handle all schedule decision making, such that the computational responsibilities of individual beacons may be reduced to transmitting pulses when instructed to do so. The controller waits (610) for a first RF time slot and selects (612) a random active beacon, assigning (620) the RF timeslot to the selected beacon. The selected beacon transmits its RF and acoustic pulses. The central controller changes the status of the selected beacon to "retired" (622) in an index of beacons maintained by the central controller, and sets a timeout (624) for each beacon whose acoustic cone of propagation 112 overlaps that of the selected beacon. This may be based, for example, on a stored list of which beacons overlap with which beacons, and/or may be based on stored map data indicating a location of each beacon. Each timeout is set based on the maximum time of flight of the acoustic pulse ($t_{TOF}$) to be transmitted by that beacon.

The central controller checks (626) its index to determine whether all beacons 110 have transmitted their pulses. If not (626 "No") the central controller waits (632) for the next RF timeslot and reactivates (634) each non-retired beacon whose acoustic timeout has expired, updating the index of beacons. Based on the index of beacons, the central controller determines (636) whether there are any active beacons. If there are no active beacons (636 "No"), this means that all beacons are either retired or in a time-out. The central controller then waits (632) for the next RF timeslot, reactivates (634) beacons whose time outs have expired, and checks again. When there are active beacons (636 "Yes"), the central controller selects (612) a next random active beacon to transmit.

The process continues in a loop until all beacons have transmitted (626 "Yes"). At that point, the central controller waits (640) for the first RF timeslot that occurs at or after the expiration of all of the timeouts, and reactivates all beacons (644), resetting the status of all beacons in the index to "active."

Figure 6B:
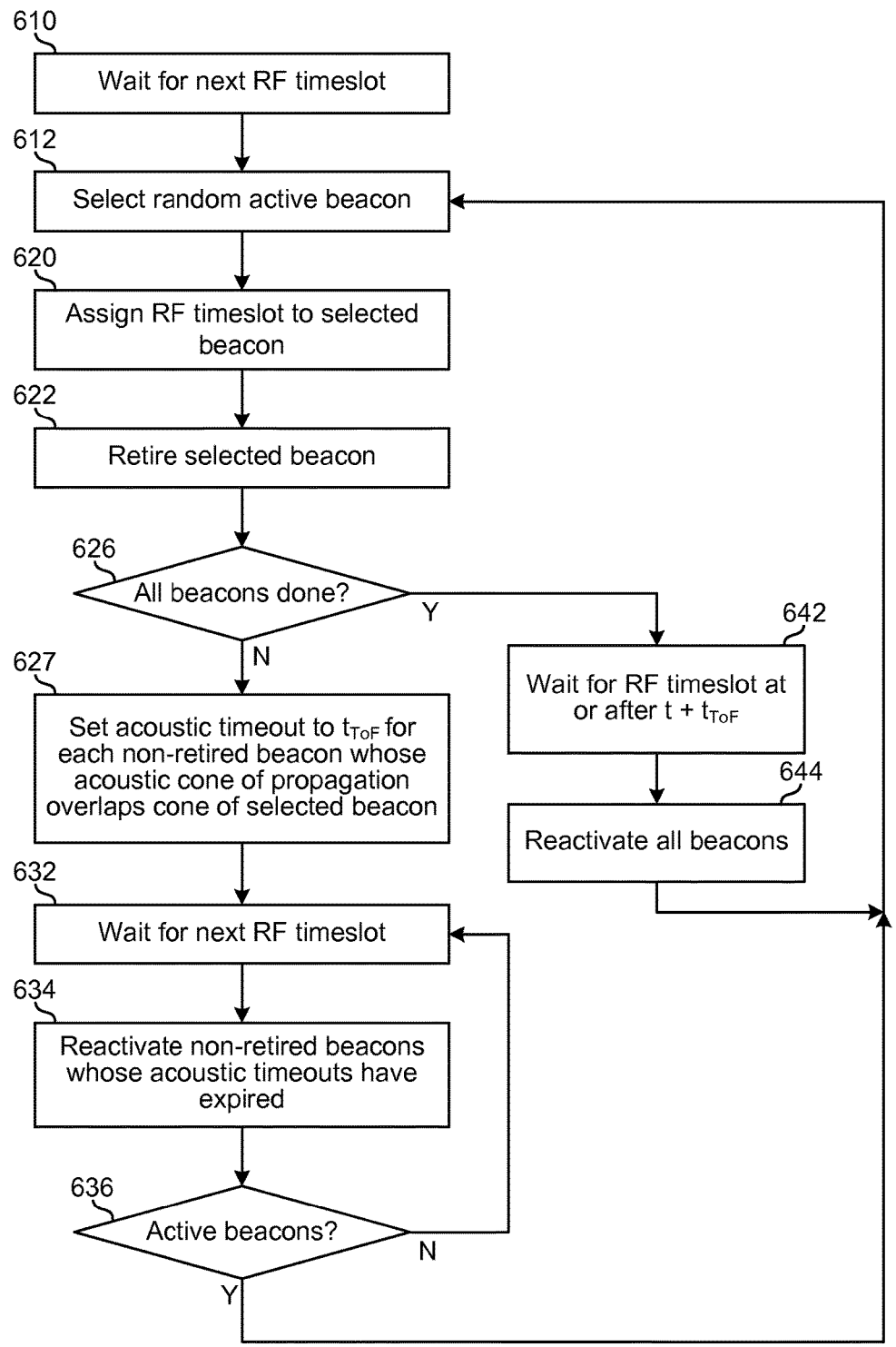

FIG. 6B illustrates a variation on the process in FIG. 6A where the order of setting timeouts and checking whether all beacons have transmitted (626) is reversed. In this variation, timeouts may be set for all beacons (624 as illustrated in FIG. 6B) or only for non-retired beacons (627 as illustrated in FIG. 6B). After all beacons have transmitted (626 "Yes"), the central controller waits (642) for the first RF timeslot occurring at or after the maximum time of flight for an acoustic pulse ($t_{TOF}$) in the system, and reactivates all beacons (644) before starting the loop again. Having the same effect as waiting for expiration of all timeouts in FIG. 6A, waiting for a duration of at least $t_{TOF}$ in FIG. 6B allows any propagating acoustic pulses to fade below the detection thresholds before starting the cycle again, thereby avoiding the possibility that a listening device 120 might receive two acoustic pulses at a same time (e.g., one from the new cycle, one from the old).

Figure 6C:
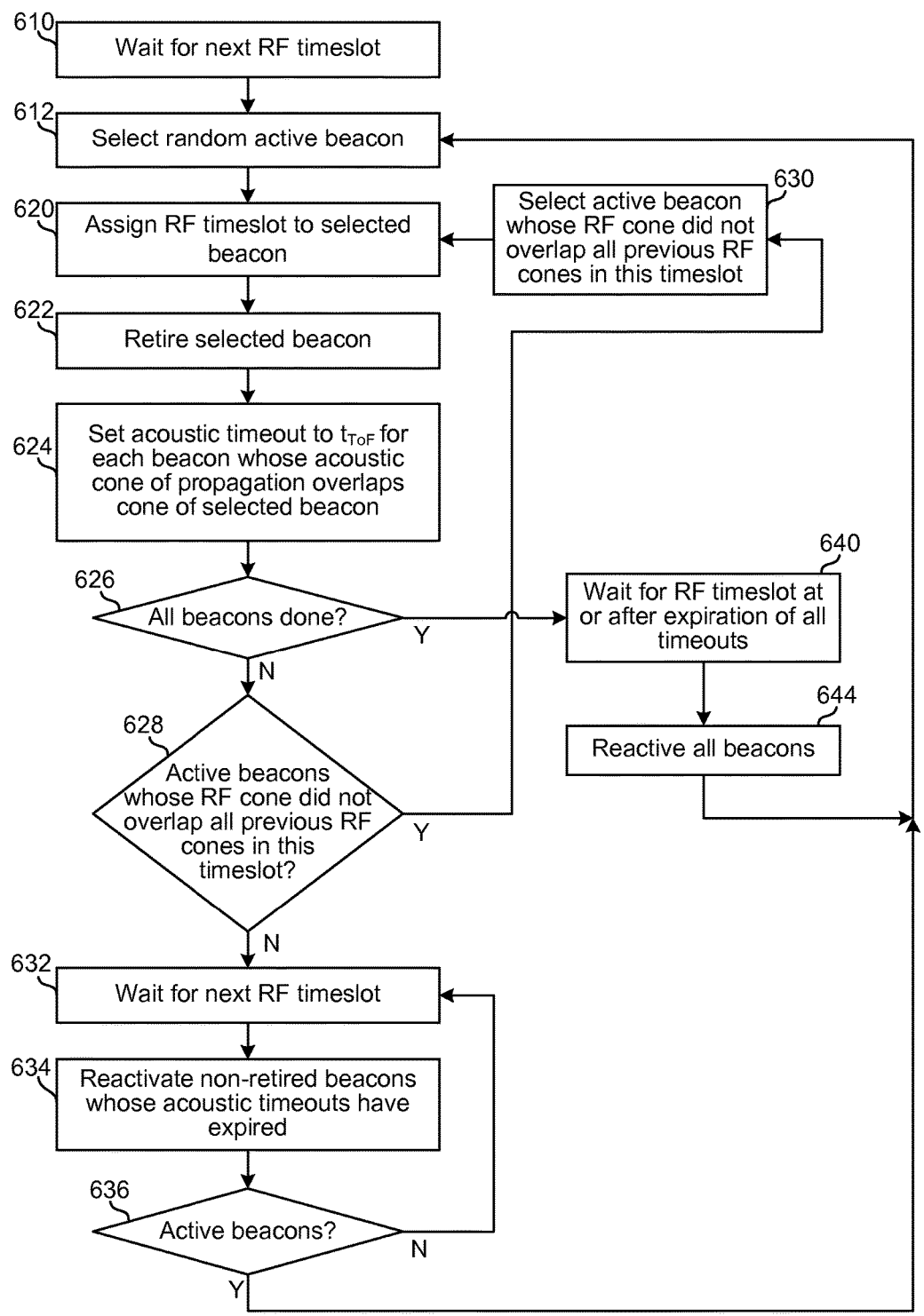

FIG. 6C illustrates a variation on the process from FIG. 6A adapted for a system where the RF signal detectability ranges (e.g., cones of propagation) from some beacons do not overlap with the RF signal detectability ranges from other beacons. As a result, multiple beacons in the system may broadcast their pulses in a same RF timeslot, while listening devices in the system continue to receive one RF pulse per RF timeslot (or one RF pulse per code per timeslot, if employing CDMA).

The difference between FIGS. 6A and 6C is the introduction of an RF slot-stuffing loop routine (i.e., 628, 630) that can trigger multiple beacons per RF timeslot. After a beacon is selected (620), a determination (628) is made as to whether there are active beacons listed in the index of beacons whose RF cone of propagation does not overlap those of all previously selected beacons in the current timeslot. If there are, an active beacon whose RF cone did not overlap all previous RF cones in this timeslot is selected (630), and the RF timeslot is also assigned (620) to this additional beacon, which transmits its RF and acoustic pulses. This loop continues until no active non-RF overlapping beacons remain for the current timeslot (628 "No"), at which point the process advances to the next timeslot (632). The variation in FIG. 6C may be modified based on FIG. 6B, reversing the order of steps 624 and 626 (or using steps 626 and 627), and replacing step 640 with step 642.

Each RF pulse has a maximum time-of-flight less than duration of an RF timeslot. In view of the brevity needed for an RF timeout, while additional RF-timeout processing steps may be performed to provide an RF timeout and then reactivate RF-overlapping beacons upon the next RF timeslot, such steps would amount to "bookkeeping" steps internal to how step 628 keeps track of whether a beacon has or has not RF-overlapped with a selected beacon during the current timeslot. The determination (628) as to whether there are active beacons whose RF cone of propagation did not overlap all previous RF cones in this timeslot is therefore functionally equivalent to having an RF timeout assigned to beacons that have an RF cone of propagation which overlaps that of a selected beacon (as is done with the acoustic cones), but where the timeout period expires by the next RF timeslot.

The RF cone of propagation distance may be determined by manual measurements, and should be set equal to or greater than the distance at which an RF detection filter of the most sensitive listening device in the system will detect the RF pulse from the beacon with the strongest RF signal. Whether an RF cone of one beacon overlaps that of another may be determined based on whether the distance between the beacons is less than twice the RF cone of propagation distance.

Figure 7A:
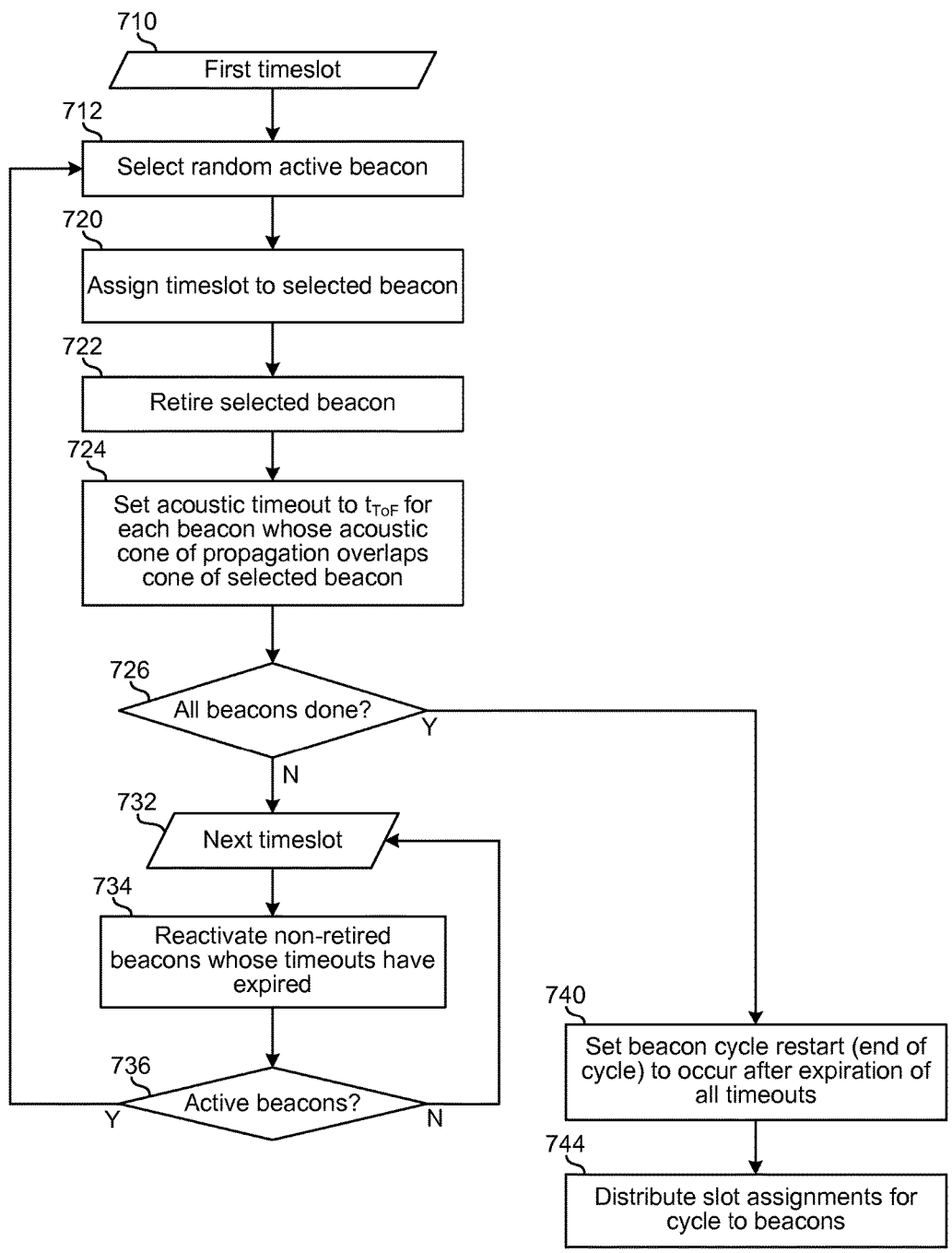
FIGS. 7A to 7C illustrate examples of processes for calculating a beacon schedule for the system and distributing the schedule to the beacons.

FIG. 7A illustrates an example of implementing the scheduling algorithm to create and pre-distribute a schedule to the beacons 110. The scheduling device initializes (710) the algorithm, setting a timeslot counter for a first timeslot and setting the status of each beacon in an index to "active."

The scheduling device then selects (712) selects a random active beacon, and assigns (720) the timeslot to the selected beacon. The selected beacon's status is changed (722) in the index to "retired." A timeout is set (724) in the index for each beacon whose acoustic cone of propagation overlaps the selected beacon, where the timeout is for at least the duration of the maximum time of flight ($t_{TOF}$) of an acoustic pulse. A determination (726) is made as to whether all beacons in the system have been selected based on the index.

If beacons remain to be selected (726 "Yes"), the scheduling device proceeds to the next RF timeslot (732) and updates the index to reactivate (734) those beacons whose timeouts will have expired. The scheduling device then determines (736) whether there are active beacons listed in the index. If not (736 "No"), the scheduling device advances to the next timeslot (732), reactivates (734) non-retired beacons whose timeouts will have expired, and tries again. If there are active beacons (736 "Yes"), the scheduling device loops back and selects (712) another active beacon.

This process of assigning beacons continues until all beacons have been selected (726 "Yes"). The scheduling device then sets (740) a beacon cycle to restart after an expiration of all timeouts, rounded up in units of RF timeslots to a time of the next RF timeslot following expiration of all timeouts. A schedule comprising the RF timeslot assignments is then distributed (744) to the beacons 110. The schedule may be a single schedule for all beacons indicating which timeslot is assigned to which beacon, or a beacon-specific schedule may be distributed to each beacon instructing that beacon which timeslot is assigned to it. Each beacon in a pre-scheduled system may maintain its own "clock" synchronized with the RF synchronization 308 based on transmitted RF time or timing signals (e.g., a common time reference).

Figure 7B:
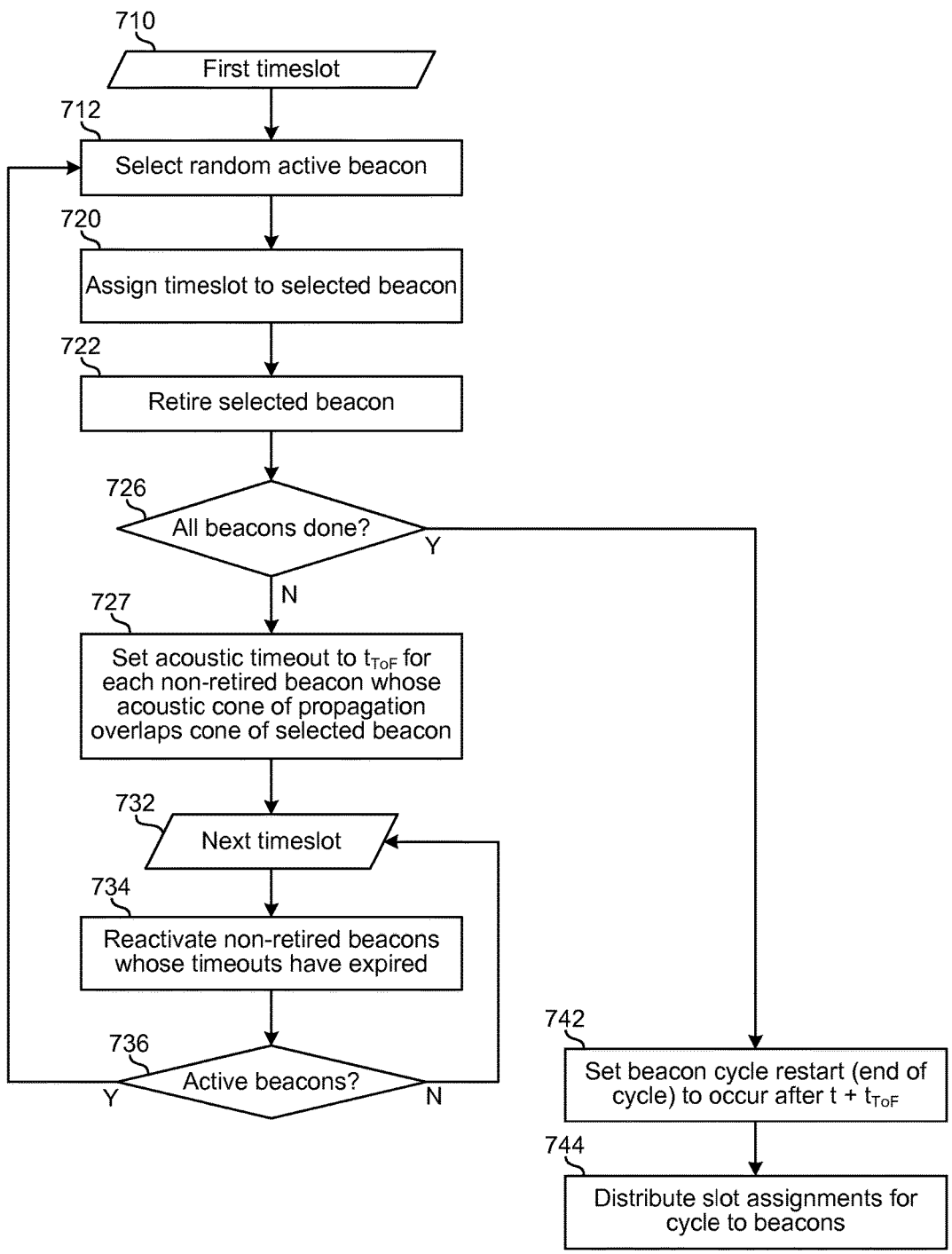

FIG. 7B illustrates a variation on the process in FIG. 7A where the order of setting timeouts and checking whether all beacons have transmitted (726) is reversed. In this variation, timeouts may be set for all beacons (724 as illustrated in FIG. 7B) or only for non-retired beacons (727 as illustrated in FIG. 7B). After all beacons have transmitted (726 "Yes"), the scheduling device sets (742) the beacon cycle to restart at or after the maximum time of flight for an acoustic pulse in the system.

Figure 7C:
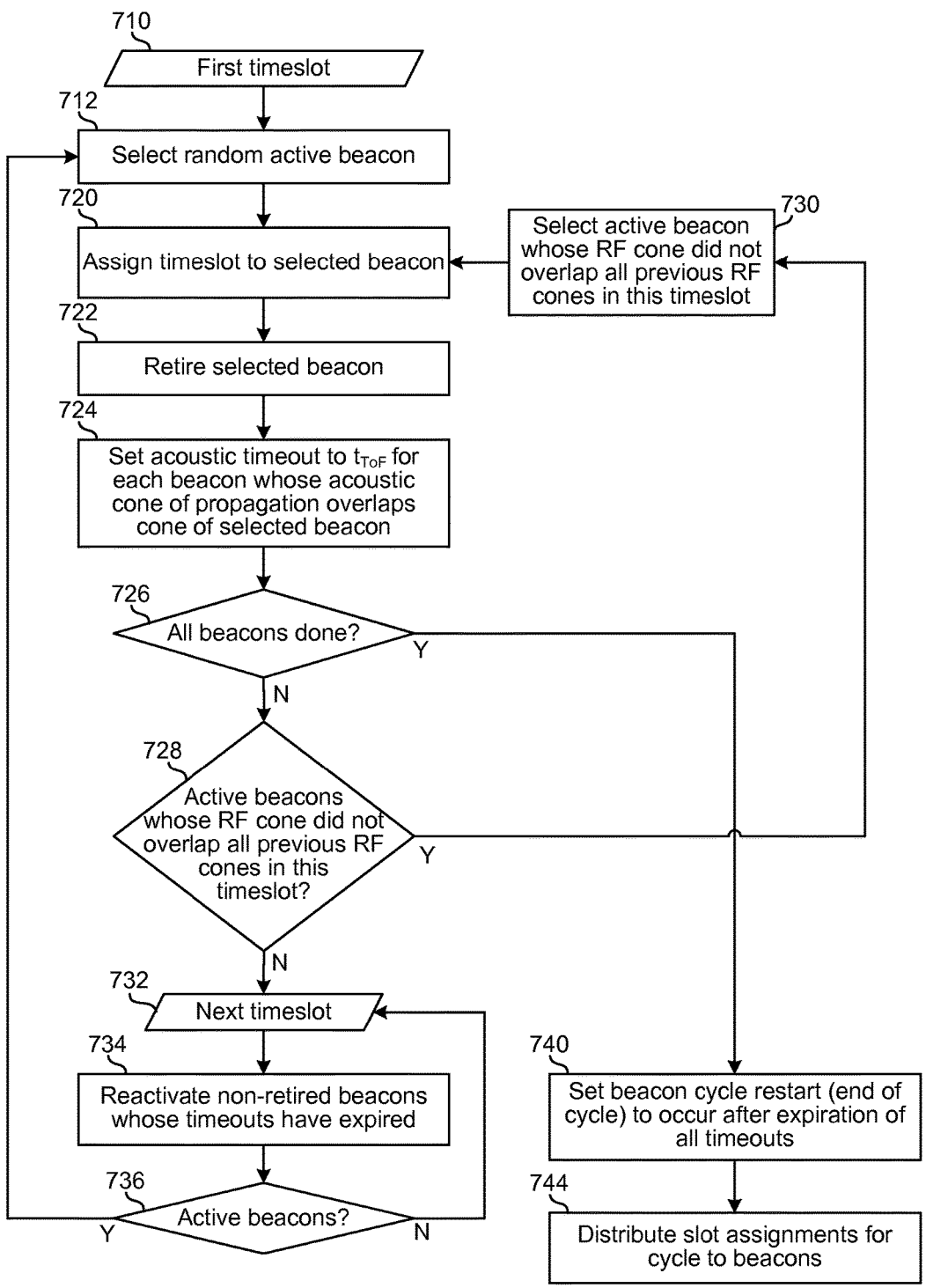

FIG. 7C illustrates a variation on the process from FIG. 7A adapted for a system where the RF signal cone of propagation from some beacons does not overlap with the RF signal cones of propagation from other beacons. As a result, multiple beacons in the system may be scheduled to broadcast its pulses in a same RF timeslot, while listening devices in the system continue to receive one RF pulse per RF timeslot (or one RF pulse per code per timeslot, if employing CDMA).

Similar to the difference between FIGS. 6A and 6C, the difference between FIGS. 7A and 7C is the introduction of an RF slot-stuffing loop routine (i.e., 728, 730) that can trigger multiple beacons per RF time slot. After a beacon is selected (720), a determination (728) is made as to whether there are active beacons listed in the index of beacons whose RF cone of propagation does not overlap those of all previously selected beacons assigned to the current timeslot. If there are, an active beacon whose RF cone did not overlap all previous RF cones in this timeslot is selected (730), and the RF timeslot is also assigned (720) to this additional beacon. This loop continues until no active non-RF overlapping beacons remain for the current timeslot (728 "No"), at which point the process advances to the next timeslot (732). The variation in FIG. 7C may be modified based on FIG. 7B, reversing the order of steps 724 and 726 (or using steps 726 and 727), and replacing step 740 with step 742.

In FIGS. 7A to 7C, schedule distribution (744) may be performed, among other ways, by transmitting the schedule using the RF communication channel. A same schedule may be used in repetition by the beacons 110 cycle-after-cycle. The scheduling device may also transmit a new schedule at the end of a cycle, randomizing the order of beacons between cycles. In particular, the new schedule may be broadcast during the beacon restart cycle (corresponding to the time added to the schedule by steps 740 or 742) while the beacons wait for the acoustic pulses to dissipate.

Figure 8A:
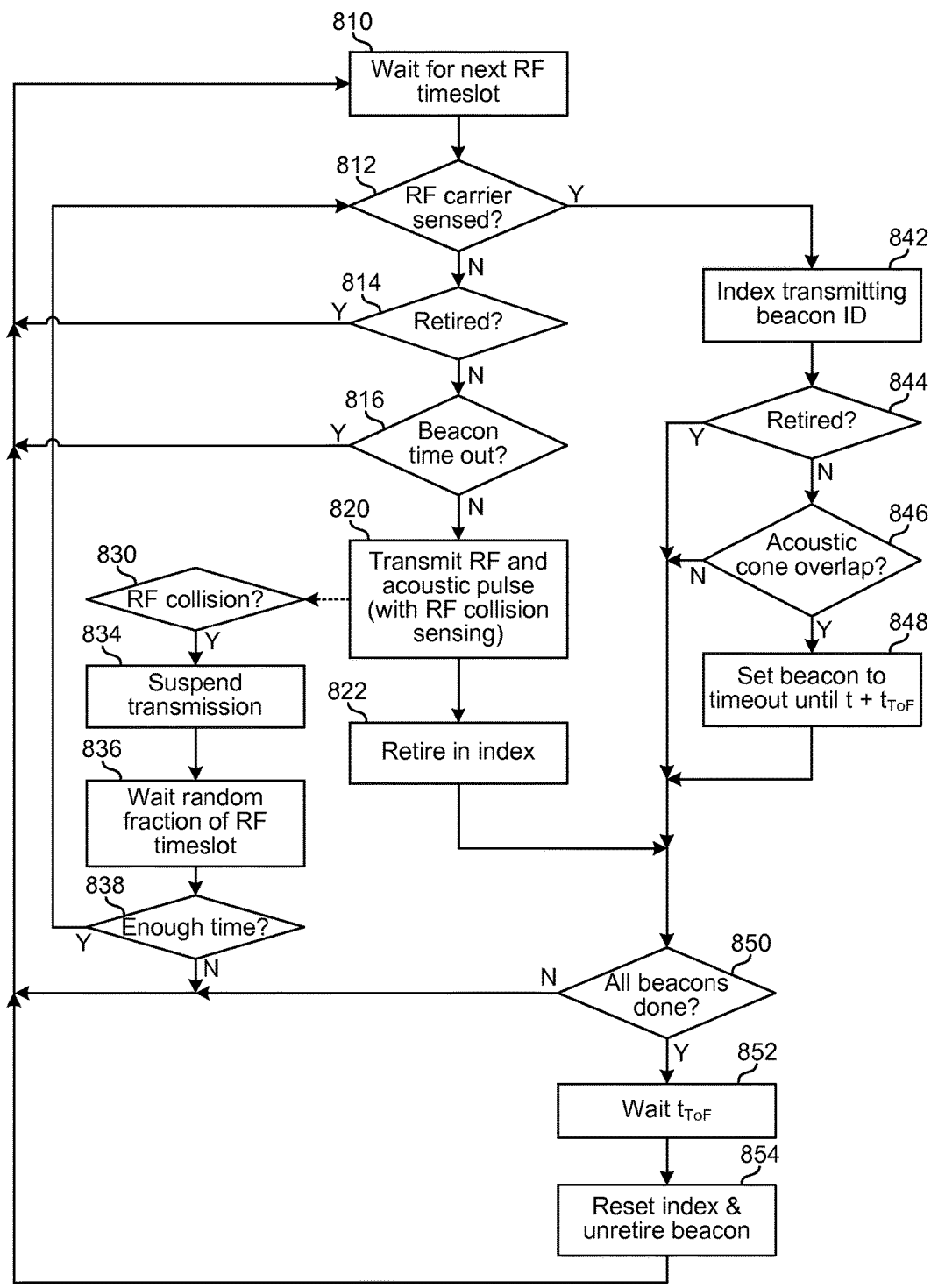
FIGS. 8A and 8B illustrate examples of processes that the beacons may individually use to autonomously implement the system.

FIG. 8A illustrates an example of the scheduling algorithm where each beacon 110 operates autonomously in a system where all beacons are within RF range of each other. An initialization cycle may proceed initial operations so that each beacon can collect the unique identifiers and location of each other beacon. For example, when a new beacon is added to the system, it may transmit an RF message informing the other beacons of its existence.

Autonomous operation utilizes carrier sensing and collision detection techniques, similar to those implemented with conventional Cricket. Each beacon maintains an index indicating the status of every other beacon in the system 100. Each beacon may determine its distance from each other beacon based on location information provided by the other beacons in their RF pulses and/or during initialization.

Beacons may store and reuse inter-beacon distance information, and maintain a list of which beacons have acoustic cones of propagation overlapping its own.

A preset constant may be used by each beacon as the radius of the acoustic cone of propagation of every beacon in the system. As an alternative, the acoustic cone of propagation of a beacon may be measured when a beacon is added to the system, and the beacon configured to transmit its acoustic cone of propagation radius in the initialization RF message announcing itself to other beacons when added to the system and/or to include the radius in the information included in its RF pulse (510).

The beacon waits (810) for the next RF timeslot. Each beacon may maintain its own "clock" synchronized with the RF synchronization 308, synchronizing with transmitted signals (e.g., a common time reference). The beacon checks (812) to see if an RF carrier is sensed, indicating that another beacon is transmitting. If no other beacon is transmitting (812 "No"), the beacon checks (814) to see if its own status if "retired." If it is retired (814 "Yes"), it loops back to wait (810) for the next RF timeslot. If the beacon is not retired (814 "No"), it check (816) to see if it is timed out, or a timeout has expired. If it is timed-out, it loops back to wait (810) for the next RF timeslot.

If the beacon is not timed out (816 "No"), the beacon transmits (820) its RF and acoustic pulse, while continuing to sense for RF collisions with other beacons. If no collision is detected, the RF pulse and acoustic pulse are transmitted to completion, and the beacon notes (822) that it is now retired in its own index.

If carrier sensing does detect an RF collision (830 "Yes"), the beacon suspends (834) transmission of both its RF and acoustic pulses. Collision detection occurs quickly enough that a listening device 120 should not interpret the suspended pulses as actual "detected" pulses, and/or the listening device may require a minimum RF and acoustic pulse duration before the pulse is classified as "detected." Each listening device may also discard information from any RF pulse that terminates before it conveys an entirety of its beacon-specific information (e.g., beacon ID, spatial coordinates, room identifier, etc.). After suspending (834) transmission, the beacon waits (836) a random fraction of the RF timeslot and then determines (838) whether enough time remains in the current RF timeslot that it could transmit an entirety of its RF pulse before the timeslot ends. If enough time does remain (838 "Yes"), the process loops back (to step 812) and tries again in the same RF timeslot. If not enough time remains in the current RF timeslot (838 "No"), the process loops back (to step 810) to wait for the next RF timeslot.

If another RF carrier is sensed (812 "Yes") prior to the beacon attempting to transmit (820), the identity of the transmitting beacon is indexed (842). If the RF pulse terminates before it conveys an entirety of its beacon-specific information, the RF pulse may be ignored (parallel to how the listening devices discard partial RF pulses). The beacon also checks (844) to see whether it is retired. Even when retired, a beacon continues to monitor the transmission of other beacons so that it may determine when all other beacons have transmitted. If it not retired (844 "No"), it checks (846) to see whether its own acoustic cone of propagation overlaps that of the transmitting beacon. Whether there is acoustic cone overlap may be determined by comparing the distance between beacons with a preset value corresponding to the radius of the acoustic cone of propagation. If the distance between beacons is less than twice the cone radius, a determination is made that there is acoustic overlap (846 "Yes"), and the beacon sets (848) its own timeout for at least the time of flight of an acoustic pulse $t_{TOF}$.

If the beacon determines (844 "Yes") that it is retired after indexing (842) the beacon ID of another beacon, or determined (846 "No") that its own acoustic cone of propagation does not overlap with that of a transmitting beacon, or set its own timeout (848), the beacon checks (850) the index to determine whether all beacons have transmitted during the current cycle of the scheduling algorithm. If they have not (850 "No"), the process loops back to wait (810) for the next RF timeslot. If they have (850 "Yes"), waits 852 for at least the duration of the time of flight ($t_{TOF}$) of an acoustic pulse before beginning a new cycle of the scheduling algorithm and resets (854) its index, resetting all beacons to "active."

As each beacon involved in the RF collision (830) should be suspending its own transmission, the colliding RF beacon need not be indexed (842). Also, although illustrated as discrete steps, RF carrier and collision sensing (e.g., 812, 830) may be continuous. So for example, while the beacon is waiting the random fraction of an RF timeslot (step 836), if a new RF pulse is detected (step 812), that pulse may be indexed (step 842). In other words, waiting the random fraction of the RF timeslot (836) controls whether the beacon will attempt to transmit its own RF and acoustic pulses (820), rather than controlling its ability to monitor what other beacons are doing.

Figure 8B:
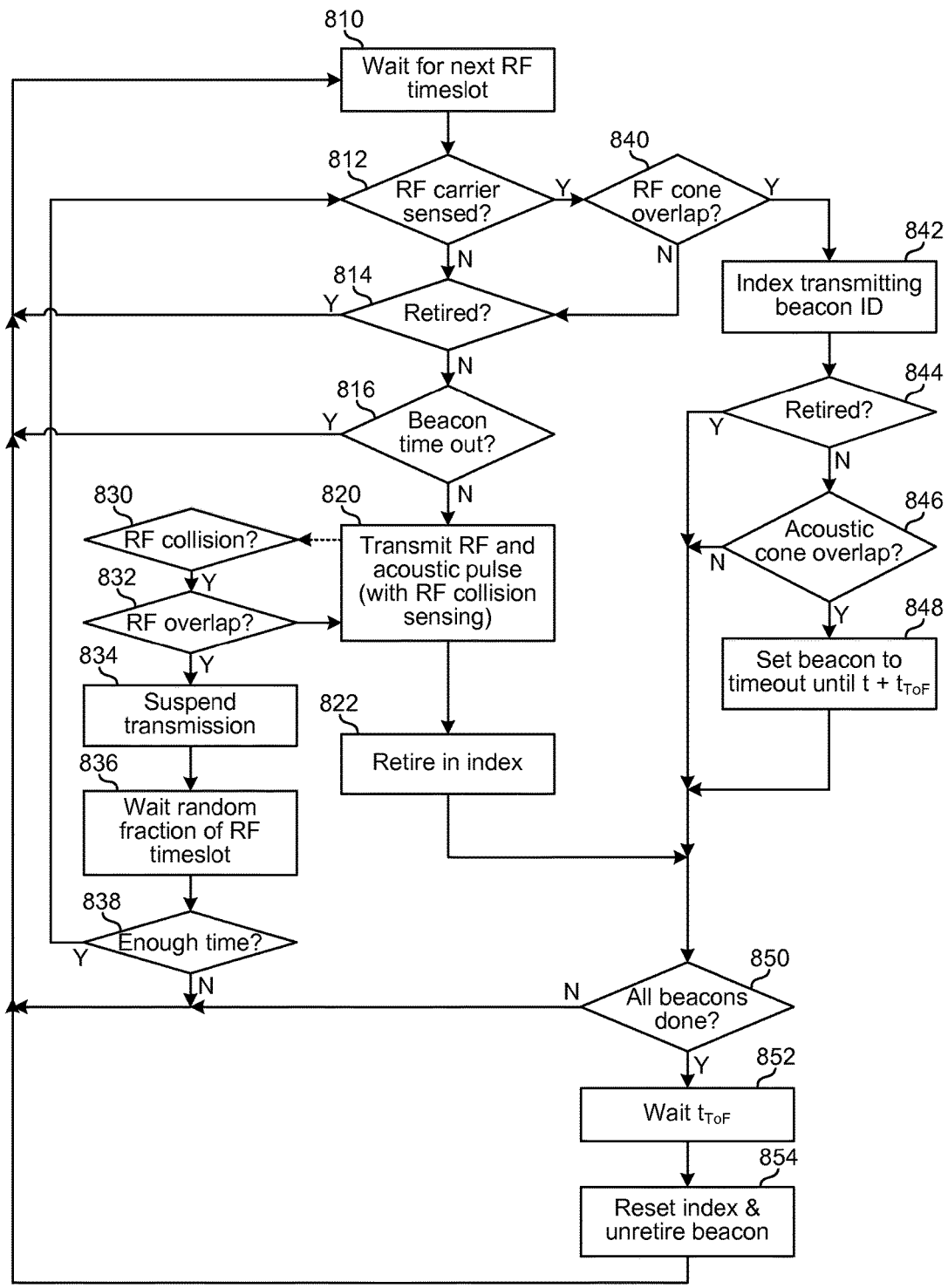

FIG. 8B illustrates a variation on the process from FIG. 8A adapted for a system where the RF signal detectability range (e.g., cone of propagation) for some beacons does not overlap with the RF signal detectability ranges of other beacons, relative to the RF detection sensitivity of listening devices within the system. Similar to the processes illustrated in FIGS. 6C and 7C, multiple RF pulses may simultaneously propagate using the process in FIG. 8B.

As discussed above, a threshold of an acoustic signal filter of each listening device serves as a cutoff as to whether an acoustic pulse is or is not "detected." The listening devices may include a corresponding RF filter to determine whether a signal magnitude of a received RF pulse exceeds a cutoff threshold, to determine whether or not an RF pulse is "detected." Whether an RF pulse falls above or below this threshold may be used to define an RF signal detectability range (e.g., cone of propagation) of a beacon.

However, in a system using a beacon autonomously implementing the process in FIG. 8B, an autonomous beacon's RF receiver may need to be more sensitive than that used by the listening devices and/or use an RF pulse "detection" discrimination filter with a different cutoff threshold, since the beacon must keep track of what other beacons are doing. That is to say, depending in part on the RF emission pattern of each beacon, two beacons may be located at a distance from each other that is greater than the RF signal detectability range (set based on the detection sensitivity of the listening devices). The beacon may determine whether its RF cone of propagation (in added steps 832 and 840) does or does not overlap with that of another beacon based on its distance to that beacon, as calculated from the spatial location information included in a received RF pulse. Once that distance to another beacon is determined, that distance may be stored by the beacon. RF cone overlap may be determined based on whether the beacon-to-beacon distance is less than twice the radius of the RF pulse detectability range. Which beacons have been determined to have RF cones of propagation that overlap with this beacon's RF cone may also be stored.

Referring to FIG. 8B, if an RF carrier is senses (812 "Yes"), a determination (840) is made as to whether the transmitting beacon's RF cone of propagation overlaps that of the current beacon. If the cones do not overlap (840 "No"), the RF signal is ignored. Otherwise (840 "Yes"), the transmitting beacon is indexed (842). Similarly, if an RF collision is detected (830 "Yes"), a determination (832) is made as to whether the RF cones overlap. If they do overlap (832 "Yes"), the beacon suspends (834) RF and acoustic pulse transmission. Otherwise (832 "No"), transmission (820) of its RF and acoustic pulse continues uninterrupted. Using beacon-to-beacon distance to make the RF cone overlap determination requires receiving enough of the other beacon's message to determine its beacon ID and/or spatial coordinates.

In the alternative to using spatial coordinates to determine RF cone overlap, the beacon in FIG. 8A can be adapted to determine RF cone overlap by setting the beacon's receiver sensitivity and RF "detection" filter threshold so that the beacon will "detect" or "sense" an RF pulse from another beacon located up to twice the distance corresponding to an RF cone of propagation, and ignore other RF pulses. While this is less precise than calculating overlap based on spatial coordinates and is more susceptible to variations in receiver tolerances between beacons, it is also faster, resulting in a quicker collision detection and recovery. Among other reasons this approach is faster is that there is no need to determine the other beacons beacon ID or spatial coordinates before deciding whether there is RF detectability overlap. By passing received RF signals through the cutoff filter in this way, RF carrier sensing 812 and collision detection 830 are configured to permit multiple beacons to simultaneously transmit RF pulses on a same RF channel at a same time, since RF pulses from beacons more than twice the RF cone of propagation distance will be ignored (e.g., 812 "No").

As mentioned above, although the detectability range of the RF emission propagation patterns of beacons are described as "cones" for the purpose of demonstrating the processes in FIGS. 6C, 7C, and 8B, the beacons may have other RF emission patterns such as omnidirectional spherical or semi-spherical emission patterns. Therefore, an "RF cone of propagation" should be understood to refer to a range of detectability (by a listening device) relative to the propagation pattern of a beacon's RF pulse emission, with boundaries of the pattern delineating where the emission has sufficient energy to potentially be "detected" by a listening device of the system.

FIGS. 9A to 9D illustrate the four sets of RF pulses proceeding an acoustic pulse, as received at a listening device 120 (as extracted from FIGS. 5A and 5B). As expressed by Equation [2], the time difference of arrival (TDOA) between an RF pulse and an acoustic pulse is directly proportional to the distance between the beacon 110 and the listening device 120. However, if there are multiple RF pulses preceding an acoustic pulse, the listening device 120 does not know which of the candidate beacons produced the acoustic pulse, and may therefore treat each possible combination as a potential "candidate" distance 942 to the beacon.

In FIG. 9A, the listening device 120 receives RF beacon messages from Beacons A, E, and R prior to receiving a first acoustic pulse, resulting in a first candidate distance set 942a including three distances. In FIG. 9B, the listening device 120 receives RF beacon messages from Beacons F, I, S, and T prior to receiving a second acoustic pulse, resulting in a second candidate distance set 942b including four distances.

Figure 9C:
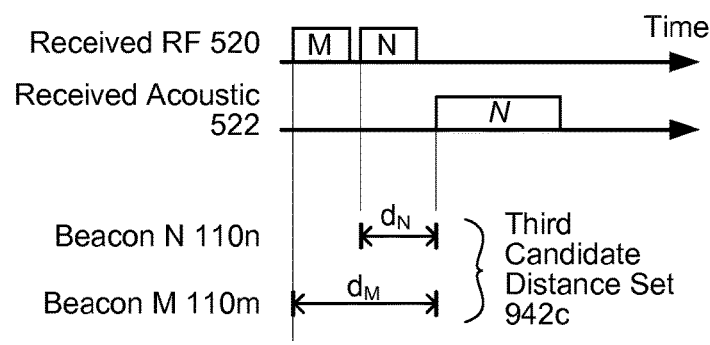
Figure 9D:
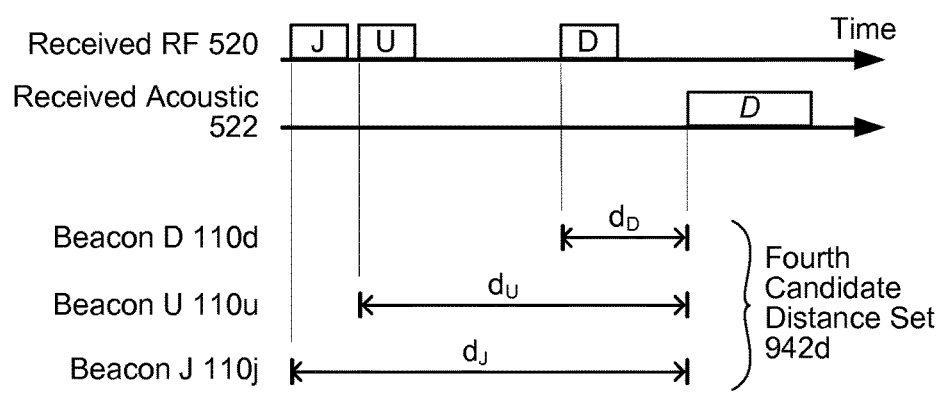

In FIG. 9C, the listening device 120 receives RF beacon messages from Beacons M and N prior to receiving a third acoustic pulse, resulting in a third candidate distance set 942c including two distances. In FIG. 9D, the listening device 120 receives RF beacon messages from Beacons J, U, and D prior to receiving a fourth acoustic pulse, resulting in a fourth candidate distance set 942d including four distances.

Figure 10:
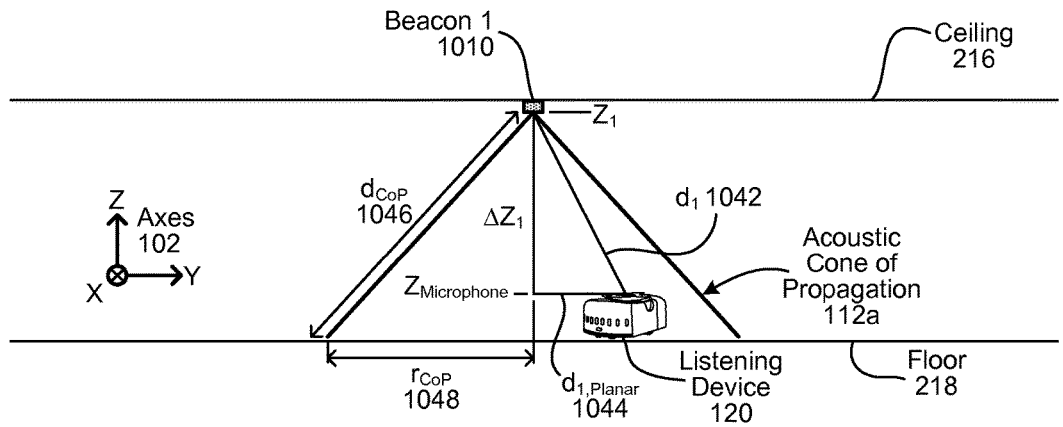
FIG. 10 illustrates how TDOA distance measurements relate to spatial coordinates in the system.

FIG. 10 illustrates how the TDOA distance measurements relate to a spatial coordinate in the system. A beacon 1010 broadcasts its spatial coordinates (e.g., Cartesian X, Y, and Z coordinates, geographical coordinates, etc.) in its RF pulse. If the distance between the ceiling 216 and floor 218 is fixed and the listening device 120 has a fixed microphone height ($Z_{Microphone}$), then the listening device 120 may determine its distance from being directly underneath the beacon 1010 ($d_{Planar}$ 1044) based on the time difference of arrival between the RF and acoustic pulses (distance d 1042). Specifically, the TDOA distance d is equal to:

$$d^2 = d_{Planar}^2 + \Delta Z^2 \qquad [3]$$

where $\Delta Z$ is the difference in height between the beacon 110 and the microphone(s) of the listening device 120 used to detect acoustic pulses. Thus, the distance $d_{Planar}$ from the beacon is:

$$d_{Planar} = \sqrt{d^2 - \Delta Z^2} \qquad [4]$$

However, the height of the listening device's microphone may not be fixed, and the height of the floor or ceiling may vary. If the vertical separation $\Delta Z$ varies, any inaccuracy will carry into the distance calculations and triangulation results. Therefore, triangulation will typically be more robust if a location of the listening device relative to the beacon 1010 is determined based on the overlap of the measured TDOA distances 1042 from multiple beacons.

The TDOA distance "d" values may be used to determine and prune/eliminate candidate locations prior to triangulation. The distance between any two beacons is known or readily calculable. For example, if a first beacon is located at spatial coordinates $X_1$, $Y_1$, $Z_1$ and a second beacon is located at spatial coordinates $X_2$, $Y_2$, $Z_2$, the distance between beacons equals:

$$d_{12} = \sqrt{(X_1 - X_2)^2 + (Y_1 - Y_2)^2 + (Z_1 - Z_2)^2} \qquad [5]$$

Since the distance between beacons is known, whether an acoustic cone of propagation of one beacon overlaps that of the other may be determine by comparing twice the maximum radius of the cone of propagation $r_{CoP}$ 1048 to the beacon-to-beacon distance $d_{12}$ (i.e., Equation [5]). A determination that the acoustic cones of propagation are overlapping may be based on the distance $d_{12}$ between beacons being less than twice the maximum radius $r_{CoP}$ of an acoustic cone of propagation.

Figure 11:
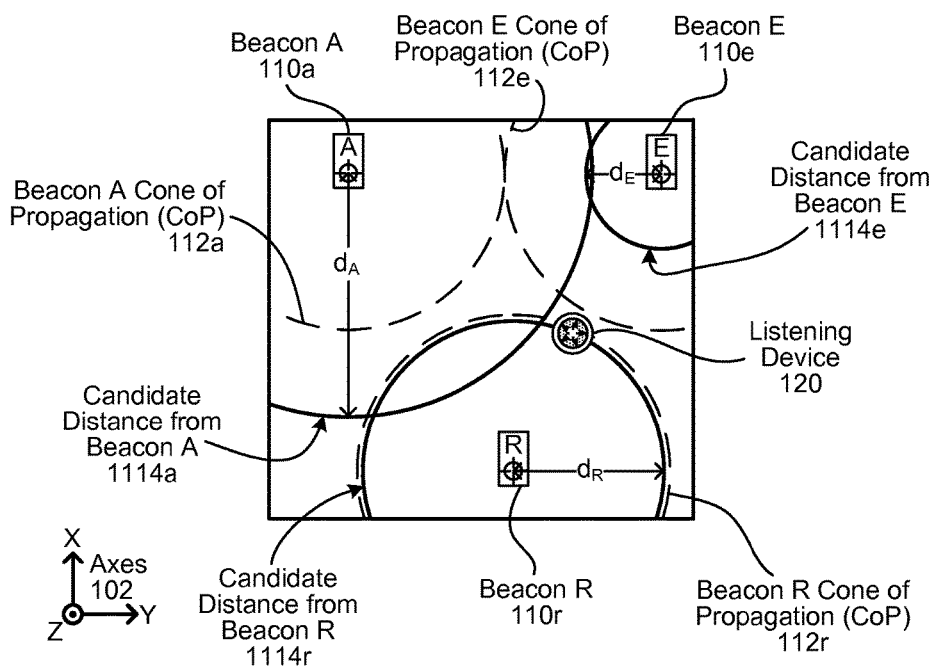
FIG. 11 illustrates an overhead view mapping the first set of candidate distances from FIG. 9A.

If a candidate distance (e.g., measured TDOA distance $d_1$ 1042) is greater than a maximum cone boundary-edge distance $dC_{oP}$ 1046 of the acoustic cone of propagation 112, logically the candidate beacon was not the origin of the acoustic pulse. In FIG. 11, the first candidate distance set 952a is mapped. The candidate distance 1114a for Beacon A ($d_A$) is larger than the maximum boundary edge distance $dC_{oP}$ of the acoustic cone of propagation 112a of Beacon A, such that Beacon A may be eliminated from the candidate set 942a. However, the candidate distance 1114e is smaller than the maximum boundary edge distance $dC_{oP}$ of the acoustic cone of propagation 112e of Beacon E 110e, and the candidate planar distance 1114r is smaller than the maximum boundary edge distance $dC_{oP}$ of the acoustic cone of propagation 112r of Beacon R 110r, such that both Beacons E and R remain in the candidate set.

Triangulation techniques may then be used to determine which candidate beacons from each set are the source of the acoustic pulse in the respective set. Using a combinatorial process, every combination of beacons remaining in the candidate sets may be combined and tested, with each combination including a beacon from each set. If there are three or more candidate sets, in an ideal system there will be a single unique match resulting from one of the combinations.

Each combination may be tested for violations of the triangle inequality, and eliminated if violated. The triangle inequality states that for any triangle, the sum of the lengths of any two sides must be greater than or equal to the length of the remaining side. For example, a candidate distance from the first set to Beacon 1 is $d_1$ and a candidate distance from the second set to Beacon 2 is $d_2$. The two beacons and the candidate location of the listening device form a triangle, with the third side being the distance between the beacons $d_{12}$. If $d_1$ is 266 cm, $d_2$ is 160 cm, and the inter-beacon distance $d_{12}$ is 50 cm, the resulting triangle violates the triangle inequality, since 266 cm>160 cm+50 cm. Therefore, any combination including both Beacon 1 and Beacon 2 can be eliminated as a potential solution.

Figure 12A:
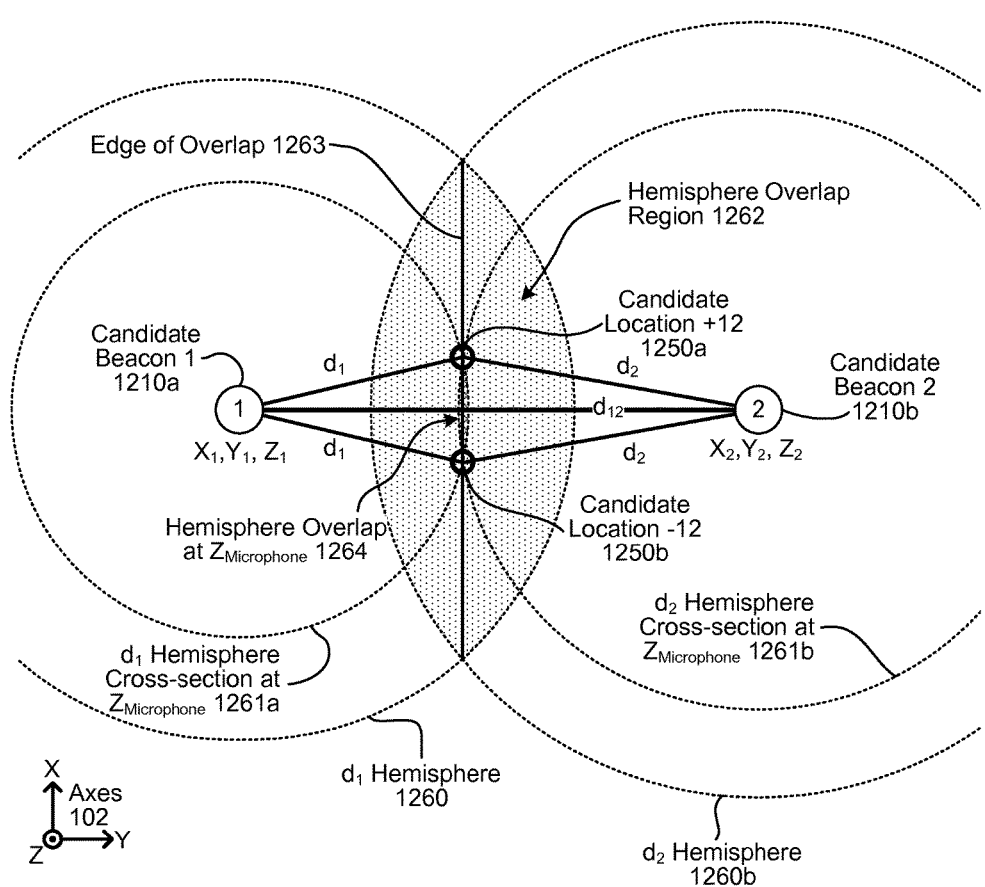
FIGS. 12A to 12C illustrate an example of how potential locations where the listening device may be located can be determined based on TDOA candidate distances from two different set.
Figure 12B:
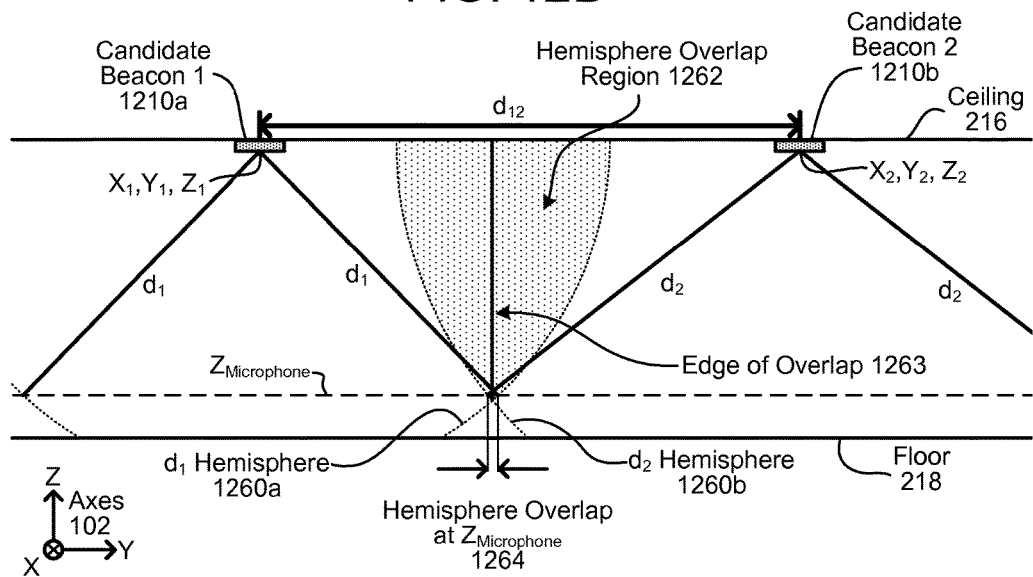
Figure 12C:
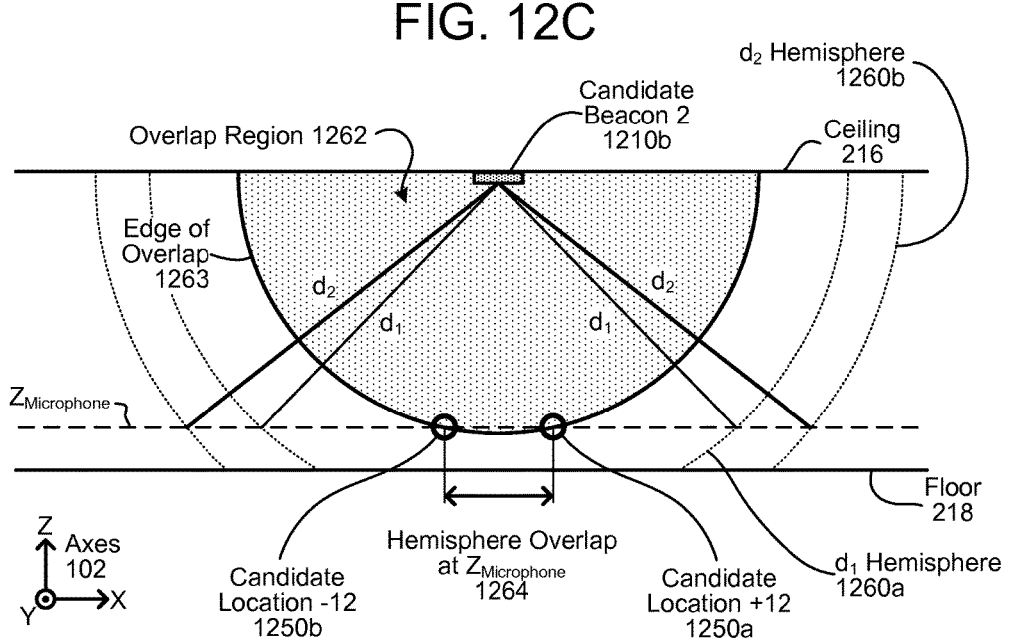

Referring to FIGS. 12A to 12C, candidate locations where the listening device might be are determined based on the location of two candidate beacons 1210a and 1210b from different sets, a candidate TDOA distance $d_1$ to the first beacon 1210a, and the candidate TDOA distance $d_2$ to the second beacon 1210b. FIG. 12A is an overhead view, FIG. 12B is a side view, and FIG. 12C is a looking past one beacon toward the other (which is hidden by the beacon in the foreground). The candidate TDOA distance for each beacon serves as a radius of a hemisphere (hemispheres 1260a, 1260b) around that beacon. The hemisphere of two candidate beacons may have an overlap region 1262 with an edge 1263 where the hemispheres intersect.

In an ideal system with no measurement error, if a candidate beacon is actually the source of the acoustic pulse, then the listening device will be located at the perimeter of the hemisphere 1260 of that beacon. Therefore, using two candidate beacons, a candidate location of the listening device can be determined based on where the hemispheres overlap, such that the candidate location will be along the edge of overlap region 1263 where the hemispheres intersect.

To demonstrate, if the vertical height of the listening device's microphone ($Z_{Microphone}$) is known in the spatial coordinate system used by the beacons, then there are two candidate locations 1250a and 1250b along the edge 1262 where the hemispheres intersect. At height $Z_{Microphone}$ an intersection of the cross-sections of the $d_1$ hemisphere 1261a and $d_2$ hemisphere 1261b occurs within an overlap region 1264, with the candidate locations 1250a and 1250b being along the edge of that overlap region 1264. However, if $Z_{Microphone}$ is not known, then what can be determined from the locations of the two beacons and the two candidate TDOA distances is that the candidate locations are along the edge of overlap 1263 of the hemisphere overlap region 1262 at an unknown height. This range of locations if further refined by adding candidate beacons and TDOA distances from additional sets, determining where the hemispheres of the beacons from the different sets intersect.

Figure 13:
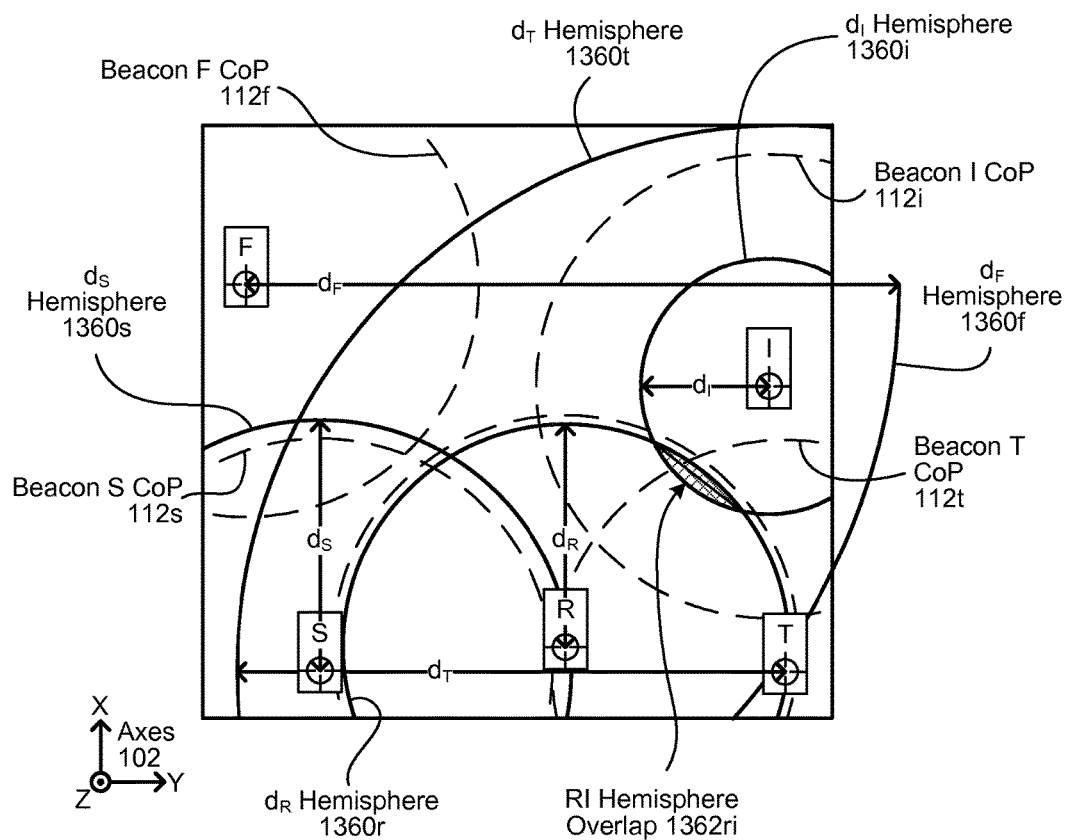
FIGS. 13 and 14 are overhead map views illustrating an example of how combinatorial techniques may be used to identify candidate locations based on the sets of candidate distances.

FIG. 13 is an overhead view illustrating candidate beacons from the second candidate set 942b along with Beacon R from the first candidate set 942a. As discussed with FIG. 11, both Beacon E and Beacon R remain from the first candidate set after Beacon A was eliminated as a candidate based on application of a rule. In the second candidate set, Beacon F 110f can be eliminated since the TDOA-based candidate distance $d_F$ (corresponding to the radius of illustrated hemisphere 1360f) is larger than the diameter of the outer edge of Beacon F's cone of propagation 112f. Beacon S 110s can also be eliminated since the TDOA-based candidate distance $d_S$ (corresponding to the radius of illustrated hemisphere 1360s) is larger than the diameter of the edge of Beacon S's cone of propagation 112s. Beacon T can be eliminated for the same reason, leaving only Beacon I 112i as a viable candidate from the second set. So the possible combinations of beacons containing beacons from the first and second candidate sets, after application of rules, will include Beacon R and Beacon I (illustrated in FIG. 13), and Beacon E and Beacon I (not illustrated in FIG. 13).

Figure 14:
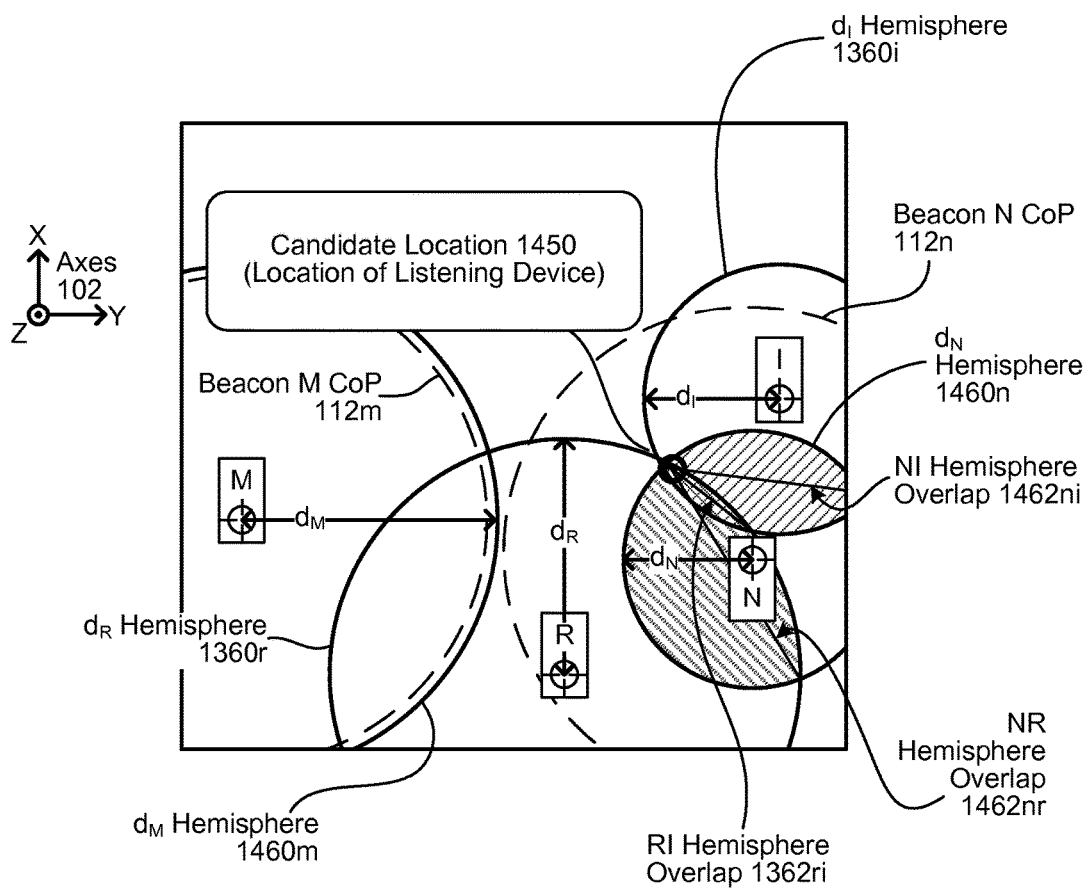

FIG. 14 is an overhead view illustrating the beacons from the third candidate set 942c along the combination including Beacon R from the first candidate set and Beacon I from the second candidate set. The third candidate set 942c includes Beacons M and N. As illustrated in FIG. 14, the TDOA-based candidate distance $d_M$ for Beacon M (correspond to the radius of illustrated hemisphere 1460m) is larger than Beacon M's acoustic cone of propagation 112m, such that Beacon M can be eliminated from the third candidate set, leaving just Beacon N. Thus, the possible combinations of beacons from the first, second, and third candidate sets, after applications of rules, will include Beacons R, I, and N (illustrated in FIG. 13) and Beacons E, I, and N (not illustrated in FIG. 14).

The hemisphere 1360r having the radius of candidate TDOA distance $d_r$ and the hemisphere 1360i having the radius of the candidate TDOA distance $d_i$ overlap (1362ri). The hemisphere 1460n having the radius of candidate TDOA distance $d_n$ and the hemisphere 1360i having the radius of the candidate TDOA distance $d_i$ overlap (1462ni). The hemisphere 1460n having the radius of candidate TDOA distance $d_n$ and the hemisphere 1360r having the radius of the candidate TDOA distance $d_r$ overlap (1462nr). All three hemispheres intersect at candidate location 1450.

In comparison, exploring the combination of Beacons E, I, and N (not illustrated), the hemisphere having the radius of the candidate TDOA distance $d_e$ overlaps with the TDOA hemisphere 1360i around Beacon I, but does not overlap with the TDOA hemisphere 1460n around Beacon N. As one combination of candidate distance sets result in a candidate location 1450 whereas the other combination does not, the received acoustic pulse in the first candidate distance set 942a is determined to have originated from Beacon R, and the candidate location 1450 is determined to be the location of the listening device. As discussed above, based on application of rules, it had already been determined that the acoustic pulse in the second candidate distance set 942b originated from Beacon I and that the acoustic pulse from the third candidate distance set 942c originated from Beacon N.

Determining if and where the hemispheres in a combination of TDOA distances overlap may be determined based on algebraic geometry. This may be performed using a non-linear least squares solver, where each of the hemispheres in a combination is expressed as constrained equations using the spatial coordinates of each beacon and the candidate TDOA distance to that beacon. So for three candidate beacons, there are three sets of XYZ spatial coordinates (known beacon spatial coordinates), three radii (candidate TDOA distances), and one set of XYZ spatial coordinates to be solved for as a quadratic equation that corresponds to the spatial location of the candidate location 1450 where the hemispheres intersect. For verification, after solving for a combination, the output of the solver for that combination can be plugged back into the system of equations and should produce the three TDOA candidate distance values for that combination. If the result does not produce the three TDOA candidate distance values, the result is invalid. Residual error may also be calculated if the result is not exact.

In practice, the TDOA distance calculated to the beacon that was the actual origin of an acoustic pulse in a candidate set may not be accurate. In addition, if the listening device is in motion, that change in position introduces another source of inaccuracy between sets. As a result, the system may not always produce an "exact" solution, which is why a non-linear least squares solver has advantages, over conventional algebraic geometry. Specifically, non-linear least squares solvers refine parameters over multiple iterations to produce a result that is an optimized approximation, such that the solver is tolerant of errors in the data.

Each combination of beacons from the selected candidate distance sets (e.g., combinations from sets 942a to 942c) can be run through the solver. If a single exact solution is produced, that can be selected as the location 1450 of the listening device. However, if there is no exact solution, the solution producing the smallest error may be compared to a confidence threshold value. If the smallest error is less than the confidence threshold value, that combination may be selected as the solution. If the smallest error is greater than the confidence threshold value, another set of candidate distances (e.g., 942d) may be added so that each combination includes four candidate beacons, and the solver calculations run again. This process of adding additional candidate beacon sets continues until either an exact solution is found, or a solution is found with an error below the confidence threshold value.

As candidate distance sets are added, older candidate distance sets may be deleted to eliminate "stale" data. Data within a specific time window may be regarded as "fresh," and older data falling outside the time window may be regarded as "stale." The time window may be, for example, a set duration based on the maximum rated of speed of the listening device. The duration of the time window may also be determined dynamically based an approximate or maximum velocity of the listening device since the time the data was collected (based, for example, on inertial navigation data), since distance data will become stale faster as the speed of the listening device increases. A limit may also be set as to how many sets may be used to determine the listening device's location. If after several iterations of the solver (adding sets), no solution has been found, it may be because a TDOA distance in a set is not even close to correct. The process of discarding stale and excess data over time will eventually delete the set containing the corrupt data, such that the problem eventually self-corrects.

Another criteria for validating a solution may be based on a map of the installation. If geometrically, a solution is on the wrong side of a wall, that solution can be discarded. This determination may be based on both the outer perimeter of the installation/facility where the beacons are located, and information about the room(s) where the beacons in a combination are located. As noted above, the information included in each RF pulse may include a room identifier indicating what "room" or space the beacon is located within. If, for example, the beacons in a combination are all in Room 1, but a solution based on where the candidate hemispheres overlap is on the other side of a wall in Room 2, that answer (while perhaps geometrically correct based on the intersection of hemispheres) can be discarded. Likewise, the map may also define navigable areas where a listening device may be, and locations outside those areas may be discarded A special case can occur when the height $Z_{Microphone}$ of a listening device's microphone is known in the system's spatial coordinates, and after the listening device collects two candidate distance sets, a determination is made that there is only one candidate beacon in each set. Having one candidate beacon in a set can occur because there was only one RF pulse before an acoustic pulse or due culling of other candidates in the set by rule (e.g., as discussed with FIG. 11). This special case results in there being only two candidate locations (e.g., 1250a, 1250b). Based on map data, if one of these two locations is discarded based on its spatial location being in a wrong room, outside of the installation, etc., then the remaining candidate location can be selected as the solution. Thus, in certain circumstances, the listening device's location can be determined after receiving only two acoustic pulses.

Figure 15:
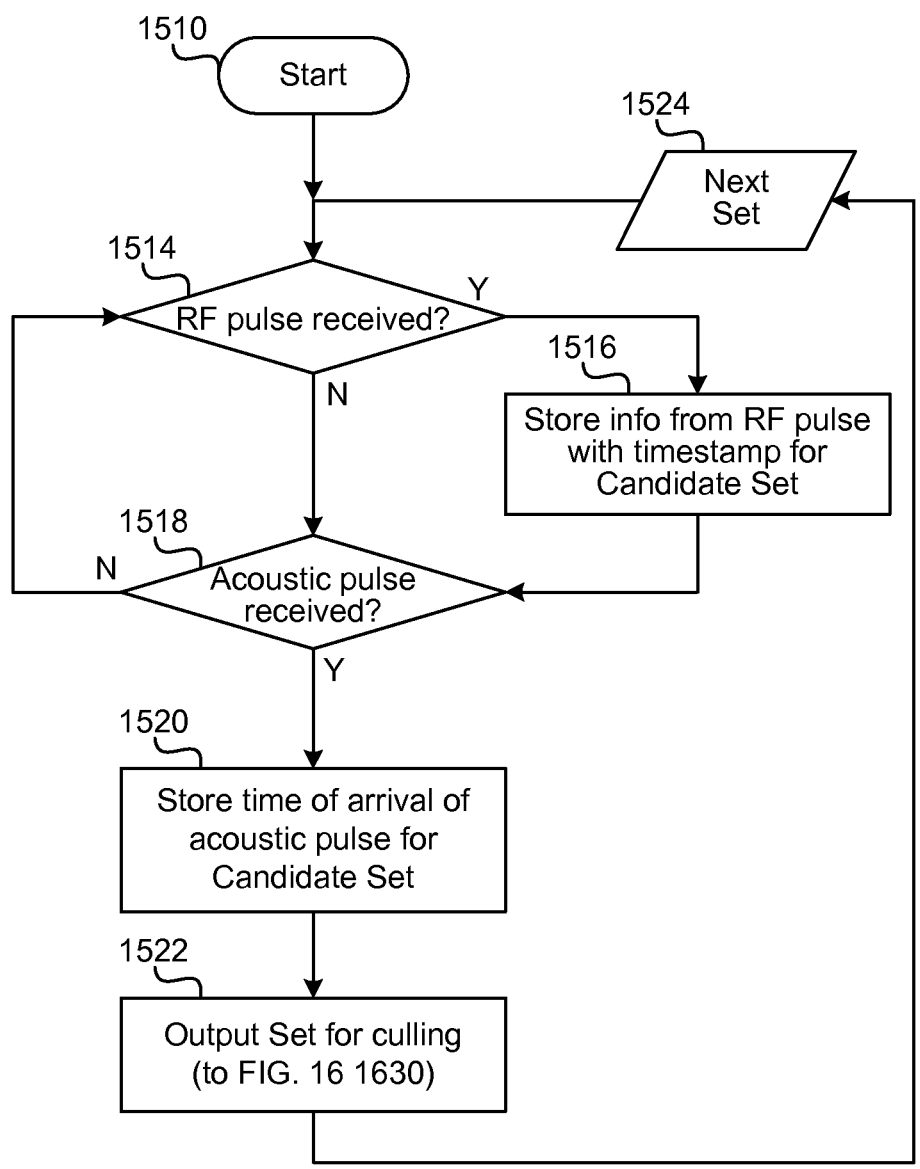
FIGS. 15 to 17 illustrate an example process used by a listening device to triangulate its own location in the system.
Figure 16:
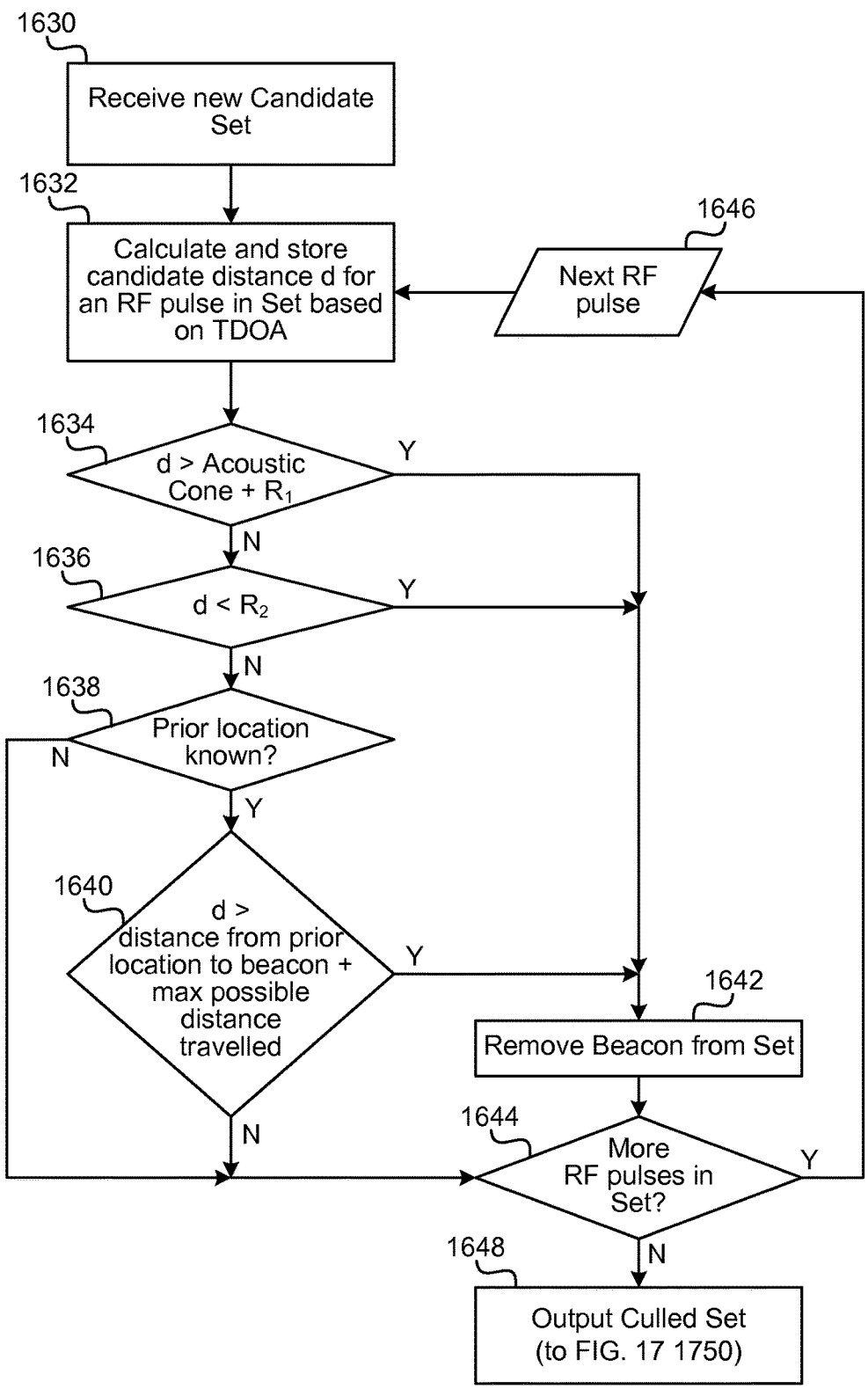
Figure 17:
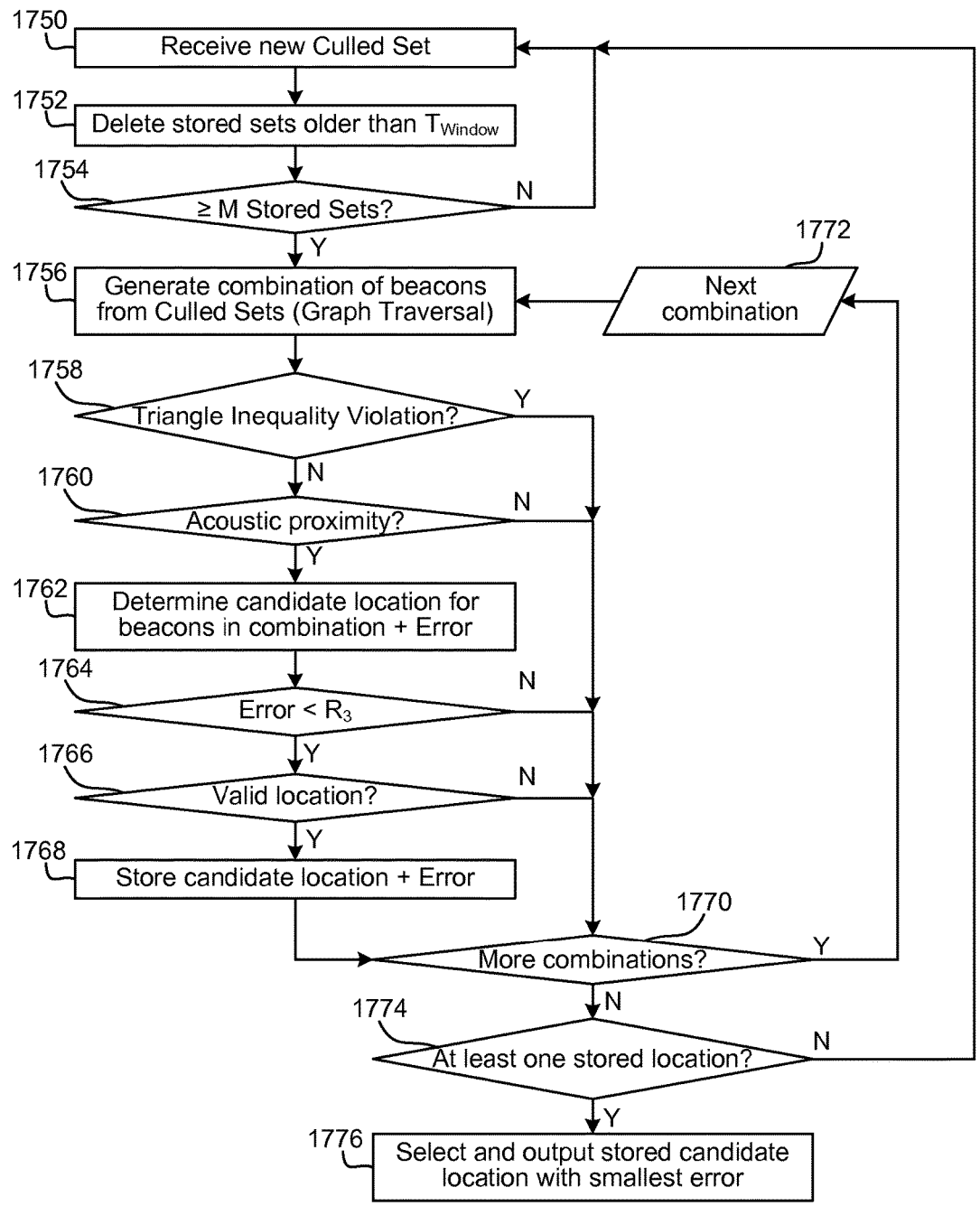

FIGS. 15 to 17 illustrate examples of processes that may be performed by the listening device 120 to determine its own location. In FIG. 15, from an initial starting process point 1510, the listening device 120 checks 1514 whether an RF pulse has been received. If an RF pulse has been received (1514 "Yes"), the data from the RF pulse is stored (1516) in a candidate set, together with a timestamp. The time stamp may be included in the message embedded in the RF pulse, and/or be based on the listening device's own clock. As noted above, if the RF pulse terminates before an entirety of the beacon-specific information it carries is conveyed, is less than a minimum duration, and/or has an energy of the RF pulse falls below an RF detection filter threshold of the listening device, such an RF pulse is disregarded (i.e., a weak or partial RF pulse results in 1514 "No").

If an RF pulse has not been detected and received (1514 "No") or has been detected and received (1514 "Yes") and conveyed beacon-specific information stored (1516), the listening device 120 determines (1518) whether an acoustic pulse has been detected and received. As noted above, if a duration of an acoustic pulse is less than a minimum duration, the acoustic pulse is identified as an echo, and/or the energy of the acoustic pulse falls below an acoustic detection filter threshold of the listening device, such an acoustic pulse is disregarded (i.e., results in 1518 "No").

If no acoustic pulse has been received (1518 "No"), the process loops back to step 1514, continually repeating this loop until an acoustic pulse is received. If an acoustic pulse is received (1518 "Yes"), the time of arrival of the acoustic pulse is stored for the candidate set. The candidate set is output for rule-based culling (to block 1630 in FIG. 16), and the process starts again to build the next candidate set (1524).

FIG. 16 illustrates various heuristics that may be applied to a candidate set to eliminate candidate beacons prior to applying triangulation techniques. A candidate set is received 1630 from step 1522 in FIG. 15. As illustrated, heuristic rules are iteratively applied to the RF pulses in the set to cull potential candidate beacons that can be eliminated as having been the origin of the set's acoustic pulse.

The candidate TDOA distance d may be calculated 1632 for an RF pulse in the candidate set based on the time difference of arrival with the set's acoustic pulse, as discussed in connection with Equation [2]. If the height of the of the device's microphone is known, then the distance $d_{Planar}$ between the listening device and the candidate beacon may also be calculated based on Equation [4], but the process is illustrated to work in a system where the height of the microphone is unknown.

The candidate distance d for the candidate beacon is compared (1634) with a maximum distance limit of the acoustic cone of propagation (e.g., $d_{CoP}$ 1046 in FIG. 10). If the candidate distance d corresponds to a separation between the candidate beacon and the listening device that is greater than the acoustic cone of propagation (1634 "Yes"), the candidate beacon is removed (1642) from the set. A margin-of-error value $R_1$ that is equal to or greater than zero may be added to the size limit of the cone avoid eliminating candidate due to difference in microphone sensitivities between listening devices, and variations in performance characteristics of beacon transducers.

The candidate distance d may also be compared (1636) with a minimum distance threshold $R_2$, and removed (1642) from the set if it is below that threshold. The distance threshold $R_2$ is based on there being a minimum separation between the listening device and a beacon. For example if the height of the ceiling 216 is much higher than the highest position a microphone of a listening device under a Beacon is expected to ever be, the difference in ceiling height and that highest position may be used to set threshold $R_2$. Among other things, this rule helps cull candidate beacons that are distant from the actual location of the listening device, where that beacon's RF pulse is received immediately before the acoustic pulse.

If the listening device knows its prior location (1638 "Yes"), the candidate distance d may also be compared (1640) with a sum of the distance the listening device was from the candidate beacon at the prior location (applying equation [5]) and the maximum possible distance the listening device might have travelled in the intervening time since it was at that prior location. If the candidate distance d from the beacon is greater than that sum (1640 "Yes"), the beacon can be removed (1642) from the set.

How the maximum possible distance a listening device might have travelled in the intervening time may be calculated in a variety of different ways. A value for the maximum possible distance may be based, for example, on a maximum rated speed of travel of the listening device (e.g., the top speed of an order fulfillment robot, forklift, etc.), where the maximum rated speed is a static value. If the listening device is a handheld device, the maximum possible distance may be based on the maximum rated speed of the fastest vehicle in the facility, the maximum speed of someone running, etc. If the listening device monitors its own speed and/or has inertial navigation capabilities (e.g., determining its own rate of motion based in part on accelerometer and/or gyroscope data), then the maximum possible distance may be based dynamically on motion data in the intervening time.

After all the culling rules are applied (e.g., 1634-1640) and/or a candidate beacon is removed (1642) from the set, a determination 1644 is made as to whether there are additional candidate beacons in the candidate set to check. If so (1644 "Yes"), the process repeats for the next RF pulse in the set (1646). Otherwise, the culled set is stored and output (1648) for application of triangulation techniques (to step 1750 in FIG. 17).

In FIG. 17, a culled candidate set is received (1750) for triangulation. The process in FIG. 17 may be performed on a set as output from FIG. 15, omitting the process in FIG. 16. However, skipping the culling heuristics increases the computational complexity of the process, as there would be more combinations of candidate beacons to test.

As noted above, "stale" sets falling outside of a rolling time window $T_{Window}$ may be deleted (1752). Excess sets may also be deleted in a first-in-first-out manner (e.g., keeping no more than six sets at a time). A determination (1754) is made as to whether there are at least a defined "M" number of stored culled sets. For conventional three-point triangulation, "M" will be three. If higher location accuracy is needed, a higher number may be selected (e.g., four or five). If the height of the microphone ($Z_{Microphone}$) is known for the listening device in the spatial coordinates of the system. then "M" may be two (providing for the special case where two candidate locations can be reduced to a single location using map data if one location appears in a wrong room, beyond a wall, etc.) If the minimum number of "fresh" sets is not available (1754 "No"), the process waits for a new set (returning to step 1750).

Otherwise (1754 "Yes"), the process generates a combination of beacons from the prioritized sets. For example, referring back to the discussion of FIG. 14, if "M" equals three, then one combination would be Beacons R, I, and N, and another combination would be Beacons E, I, and N. This may be done among other ways by graph traversal, where combinations are generated all at once or by traversing through the graph, where each candidate beacon serves as a node on the graph.

A determination (1758) is made as to whether any pair of beacons in the combination violates the triangle inequality based on the candidate distances to each beacon (based on Equation [2]) and the actual spatial distance between beacons (based on Equation [5]). Combinations that violate the triangle inequality may be cached so that the occurrence of the same pairings in other combinations may be used to eliminate those combinations from consideration without the need to check other pairing in the combination.

A determination (1760) as to whether the acoustic pulses from the beacons in a combination could potentially be received at a location based on a comparison of the room identifier information beacons may include in their RF pulses. If, for example, a beacon in a combination is located in a room that is not connected to the room where the other beacons in the combination are located, the combination may be discarded based on the lack of acoustic proximity. This situation may occur, for example, where two rooms are separated by a solid wall with no connecting passageway, and RF pulses are included in a combination from opposite sides of the wall, suggesting that one of the two RF pulses was received through the wall. As such, an assumption is made that the walls are sufficiently sound-dampening that an acoustic pulse cannot be heard through the solid wall. This means that one of the two beacons is not part of the solution. Data indicating whether there is acoustic proximity between rooms may be loaded into the listening devices with the mapping data, identifying which rooms are and are not proximate in terms of acoustic propagation. This acoustic proximity data may also be indexed by beacon.

If no violations of the triangle inequality are found (1758 "No") and the room locations of the beacons does not eliminate the combination (1760 "Yes"), a determination (1762) is made as to whether there is a point where all of the TDOA distances from the beacons in the combination intersect. This determination (1762) may be made, for example, using a non-linear least squares solution solver, inputting the spatial coordinates for each beacon in the combination and the candidate distance d to each beacon, and receiving a location and an error value as output.

The error value corresponds to the degree of separation between these intersection points used to formulate the solution (e.g., mean deviation or standard deviation). For example, if there are beacons from four candidate data sets in a combination, the hemispheres from some beacons may intersect at a first point, and the hemispheres from some beacons may intersect at a second point. The spatial location output as the solution is a combination of these points (e.g., an average), with the error value indicating the deviation.

The error value produced by the non-linear least squares solver is compared (1764) to a confidence threshold value $R_3$. If the error is greater than or equal to the threshold $R_3$ (1764 "No"), the combination can be discarded, as it is not close enough to an exact solution that it is reliable as the location of the device. The confidence threshold value $R_3$ is set based on how much error is tolerable in the location results, and may be set differently for different devices depending upon their role in the system.

The candidate location produced by the non-linear least squares solver may also be tested to determine (1766) whether it is a valid location based on map data. For example, if the candidate location occurs outside the installation or in a different room than the beacons in the set (e.g., due to the hemispheres intersecting beyond a wall) and/or outside defined navigable areas, then the location can be discarded (1766 "No").

If the location is valid (1766 "Yes") and the error is within the confidence threshold value $R_3$, the location and its error value are stored (1768) in memory. After the location is stored or a combination is discarded, the process checks (1770) whether there are additional combinations to explore. If there are (1770 "Yes"), the combination analysis repeats for the next combination (1772). Otherwise, a determination (1774) is made as to whether there is at least one stored location. If there is not (1774 "No") at least one stored location, this indicates that all of the combinations were discarded, the process loops back to wait for another culled set (step 1750). However, if there is at least one stored location (1774 "Yes"), then the stored candidate location having the smallest error is selected and output as the location of the listening device.

Various optimizations of this process may be added. For example, if a location produced by the solver (step 1762) has no error or a very small error (e.g., less than a value $R_4$, where $R_4 \ll R_3$), such that it is approximately an "exact" solution, the process may output that location as the answer without exploring any further combinations.

A listening device may periodically or continually determine its location. Once a location is determined, the listening device may start over with a new set of candidate distances, or use one or more recent sets from a previous location determination to update location.

The speed of sound varies with temperature and humidity. As known in the art, these variable may be accounted for when determining the time difference of arrival.

Inter-beacon distances based on beacon spatial coordinates may be determined once and then stored in table to reduce the processing load on listening device. After determining the inclusion of certain beacons in a combination results in the discarding of the combination (e.g., due to violating the triangle inequality), the beacon pairings that result in the combination being invalid may be temporarily cached and used to eliminate other combinations.

Figure 18:
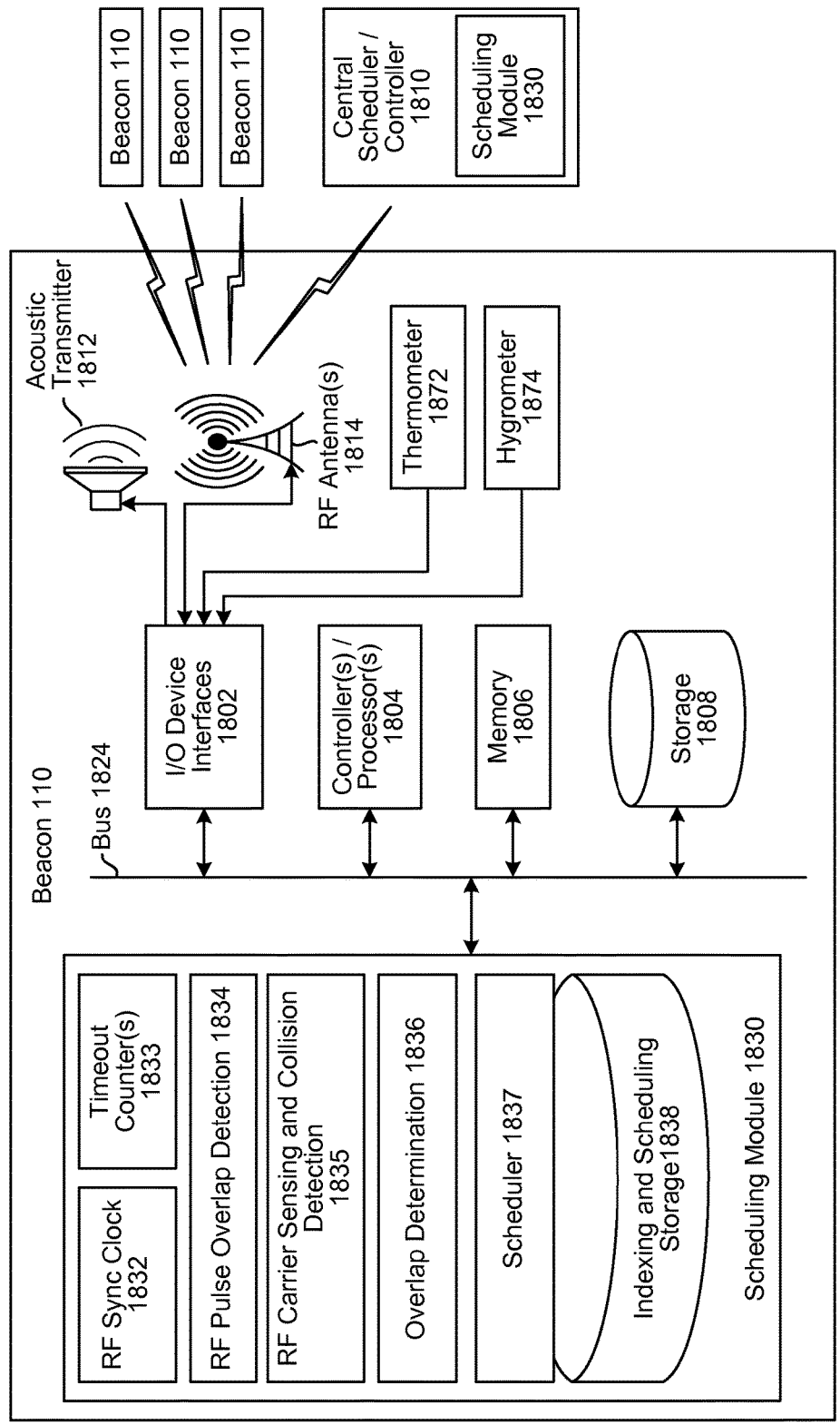
FIG. 18 is a block diagram conceptually illustrating example components of a beacon.

FIG. 18 is a block diagram conceptually illustrating example components of a beacon 110. Depending upon whether a beacon is autonomous, centrally controlled, or scheduled, components may vary. If centrally schedule, the central scheduler/controller 1810 may itself be a beacon (e.g., a master beacon) with some or all of the components of the illustrated components of the beacon 110. In operation, the beacon 110/controller 1810 may include computer-readable and computer-executable instructions that reside in memory or storage, as will be discussed further below.

The beacon 110 includes input/output device interfaces 1802. A variety of components may be connected through the input/output device interfaces 1802, including the acoustic transmitter 1812 (e.g., an ultrasonic transducer) and RF antenna(s) 1814. If the system 100 uses multiple frequencies of acoustic pulses, beacons may have multiple acoustic transmitters 1812 for different frequencies. Circuitry such as an RF transceiver and transducer driver are included in the I/O device interfaces 1802. A thermometer 1872 and a hygrometer 1874 may also be included so that the size of the acoustic cones of propagation used to determine cone overlap (e.g., 230) and the maximum time of flight of an acoustic pulse $t_{ToF}$ can periodically be adjusted for changes to the acoustic propagation properties of the ambient environment due to changes in ambient temperature and humidity.

The beacon 110 may include an address/data bus 1824 for conveying data among components of the beacon 110. Each component within the beacon 110 may also be directly connected to other components in addition to (or instead of) being connected to other components across the bus 1824.

The beacon 110 may include one or more controllers/processors 1804, that may each include a central processing unit (CPU) for processing data and computer-readable instructions, and a memory 1806 for storing data and instructions. The memory 1806 may include volatile random access memory (RAM), non-volatile read only memory (ROM), non-volatile magnetoresistive (MRAM) and/or other types of memory. The beacon 110 may also include a data storage component 1808, for storing data and controller/processor-executable instructions (e.g., instructions to perform the algorithms and processes illustrated in FIGS. 1 and 6-8). The data storage component 1808 may include one or more non-volatile storage types such as magnetic storage, optical storage, solid-state storage, etc. The device 110 may also be connected to removable or external non-volatile memory and/or storage (such as a removable memory card, memory key drive, networked storage, etc.) through the input/output device interfaces 1802.

Computer instructions for operating the device 110 and its various components may be executed by the controller(s)/processor(s) 1804, using the memory 1806 as temporary "working" storage at runtime. The computer instructions may be stored in a non-transitory manner in non-volatile memory 1806, storage 1808, or an external device. Alternatively, some or all of the executable instructions may be embedded in hardware or firmware in addition to or instead of software.

The beacon 110 and/or the central scheduler/controller 1810 further include a scheduling module 1830 that controls beacon transmission scheduling. The scheduling module 1830 may be a component of a central scheduler/controller 1810 (that communicates scheduling information to the beacon 110 via a wireless communication channel), may be a component of each individual beacon 110, or distributed there between.

An RF synchronization clock 1832 maintains the RF synchronization signal 508. The timeout counter(s) 1833 are used to determine whether a beacon is timed out due to acoustic cone of propagation overlap, and also may be used when timing out for a fraction of an RF timeslot (836).

An RF pulse overlap detection engine 1834 and an RF carrier sensing and collision detection engine 1835 are used when the beacon is operating autonomously, as discussed in with FIGS. 8A and 8B, to detect RF pulse transmissions from other beacons and RF transmission collisions. In a system where the range of an RF pulses from some beacons do not overlap the range of RF pulses from other beacons, an RF pulse received via the antenna(s) 1814 from another beacon may be input into the RF pulse overlap detection engine 1834, which applies a cutoff threshold to classify whether an energy/magnitude of the detected RF pulse is strong enough to spatially overlap with an RF pulse from this beacon 110 (relative to the detection sensitivities set for listening devices in the system). In the alternative, the RF pulse overlap detection engine may determine a distance to the beacon that transmitted a received RF pulse (e.g., based on the spatial coordinates of the beacon), and determine whether the RF pulse from that beacon could overlap an RF pulse from this beacon based on a comparison of the distance between the beacons and the RF ranges of each beacon (relative to the detection sensitivities of listening devices in the system.

The overlap determination engine 1836 calculates, stores, and/or looks up the spatial distances between beacons, and uses these spatial distances to determine whether there is RF and acoustic cone overlap.

As part of a central scheduler/controller 1810 (e.g., FIGS. 6A to 7C) or an autonomous beacon 110 (e.g., FIGS. 8A and 8B), the scheduler 1837 executes the scheduling algorithm (e.g., FIGS. 1 and 6A to 7C). As part of a beacon 110 slaved to a central schedule/controller 1810, the scheduler 1837 executes a command to transmit its RF and acoustic pulses received from the controller 1810 (issued by the controller 1810 in response to step 620 in FIGS. 6A to 6C) or executes a schedule received from the controller 1810 (issued by the controller 1810 in response to step 744 in FIGS. 7A to 7C).

Indexing and scheduling storage is used to maintain the index of beacon status used for scheduling, to store schedules received from a central scheduler/controller 1810, and/or to store beacon and system constants, such as beacon-specific information to be included in an RF pulse (e.g., a beacon's spatial coordinates, Beacon ID, room assignment, etc.), a system map indicating features such as room and installation boundaries in spatial coordinates, a table providing the radii of the acoustic cones of propagation and the maximum time of flight of an acoustic pulse $t_{ToF}$ indexed by ambient temperature and pressure, etc.

Figure 19:
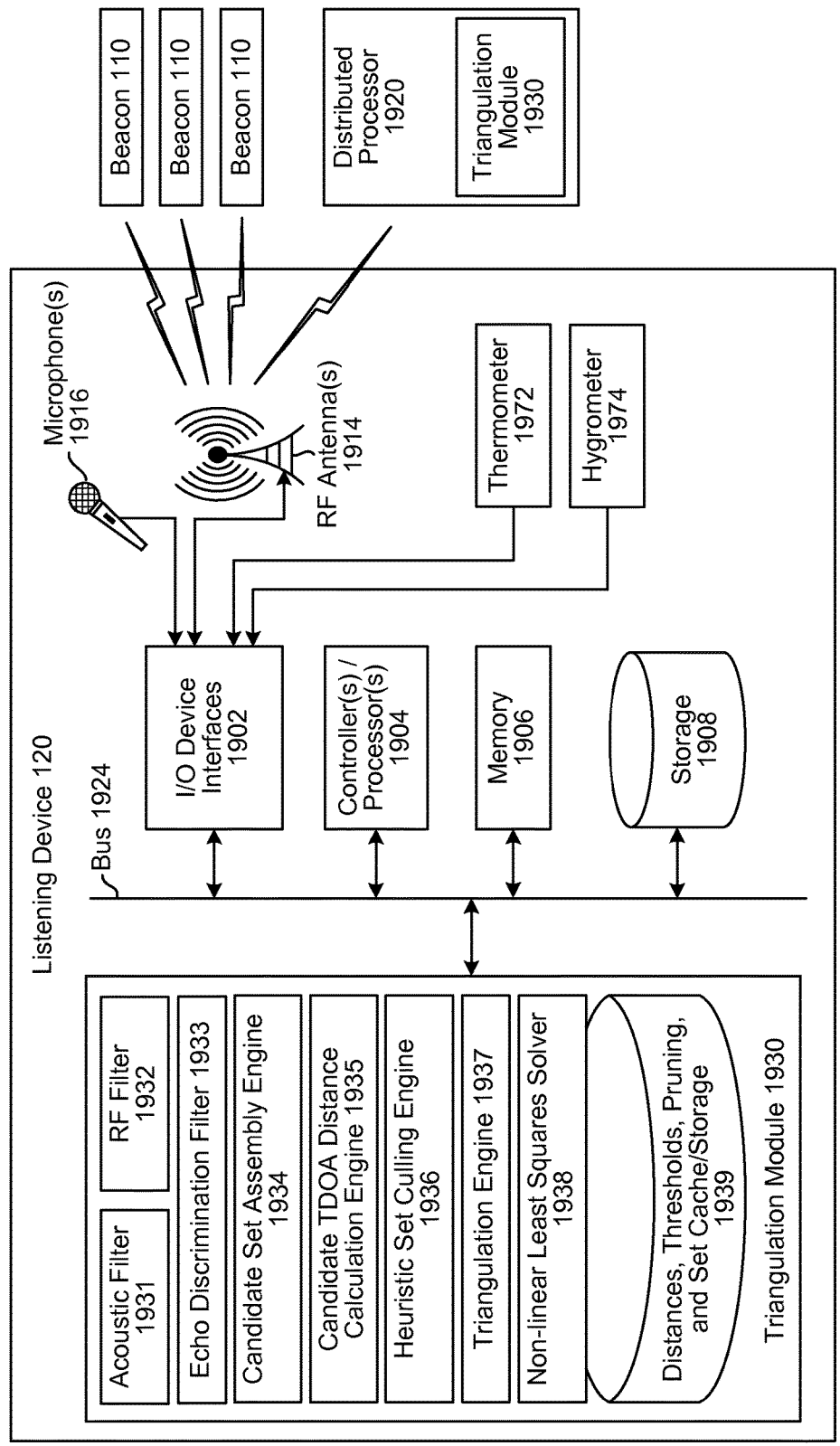
FIG. 19 is a block diagram conceptually illustrating example components of a listening device.

FIG. 19 is a block diagram conceptually illustrating example components of a listening device 120. Components of a listening device may be divided between multiple such devices, such as a wearable computer that connects by a wireless network connection to a more powerful computer to perform calculations (e.g., distributed processor 1920). The distributed processor 1920 may itself include some or all of the components of the illustrated listening device 120, and components and processing may be distributed between the listening device 120 and the distributed processor 1920. In operation, the listening device 120 and the distributed processor 1920 may include computer-readable and computer-executable instructions that reside in memory or storage, as will be discussed further below.

The listening device 120 includes input/output device interfaces 1902. A variety of components may be connected through the input/output device interfaces 1902, including the microphone(s) 1912 and RF antenna(s) 1914. Circuitry such as an RF transceiver and microphone amplifier are included in the I/O device interfaces 1902. A thermometer 1972 and a hygrometer 1974 may also be included so that the velocity of the speed of sound ($v_{Sound}$ in Equation [2]) and other propagation-related values (e.g., $d_{CoP}$, $r_{CoP}$, $t_{TOF}$) can periodically be adjusted for changes to the acoustic propagation properties of the ambient environment due to changes in ambient temperature (based on thermometer data) and humidity (based on hygrometer data). An inertial measurement unit (IMU) (not illustrated) may also be included to collect information about movement of the listening device 120, including components such as a three-axis accelerometer, a three-axis gyroscope, a magnetometer, etc.

The listening device 120 may include an address/data bus 1924 for conveying data among components of the listening device 120. Each component within the listening device 120 may also be directly connected to other components in addition to (or instead of) being connected to other components across the bus 1924.

The listening device 120 may include one or more controllers/processors 1904, that may each include a central processing unit (CPU) for processing data and computer-readable instructions, and a memory 1906 for storing data and instructions. The memory 1906 may include volatile random access memory (RAM), non-volatile read only memory (ROM), non-volatile magnetoresistive (MRAM) and/or other types of memory. The listening device 120 may also include a data storage component 1908, for storing data and controller/processor-executable instructions (e.g., instructions to perform the algorithms and processes illustrated in FIGS. 15 to 17). The data storage component 1908 may include one or more non-volatile storage types such as magnetic storage, optical storage, solid-state storage, etc. The device 120 may also be connected to removable or external non-volatile memory and/or storage (such as a removable memory card, memory key drive, networked storage, etc.) through the input/output device interfaces 1902.

Computer instructions for operating the device 120 and its various components may be executed by the controller(s)/processor(s) 1904, using the memory 1906 as temporary "working" storage at runtime. The computer instructions may be stored in a non-transitory manner in non-volatile memory 1906, storage 1908, or an external device. Alternatively, some or all of the executable instructions may be embedded in hardware or firmware in addition to or instead of software.

The listening device 120 and/or the distributed processor 1920 further include a triangulation module 1930 that determines the position of the listening device 120. The triangulation module 1930 may be a component of the listening device 120, the distributed processor 1920 (that communicates with the listening device 120 via a wireless radio communication channel), or distributed across there between, such as in the example of the listening device 120 is a wearable computing device that connects to a more powerful computer for processing (i.e., distributed processor 1920).

The triangulation module 1930 may include an acoustic filter 1931 and an RF filter 1932. An acoustic pulse received via the microphone(s) 1916 may be input into the acoustic filter 1931, which applies a cutoff threshold to the acoustic pulse to classify the acoustic pulse as "detected" or not detected. Similarly, in a system where the range of an RF pulses from some beacons do not overlap the range of RF pulses from other beacons, an RF pulse received via the antenna(s) 1914 may be input into the RF filter 1931, which applies a cutoff threshold to classify the RF pulse as "detected" or not detected. An echo discrimination filter 1933 may process a received acoustic pulse (either before, after, or in parallel with the acoustic filter 1931) to differentiate between an acoustic pulse and the echoes (reflections) of the acoustic pulse.

A candidate set assembly engine 1934 performs the processes illustrated in and discussed in connection with FIG. 15. A candidate TDOA distance calculation engine 1935 calculates the time difference of arrival candidate distances d for each RF pulse in a candidate set (e.g., 942a to 942d in FIGS. 9A to 9D) based on Equation [2]. The candidate TDOA distance calculation engine 1935 may periodically adjust the speed of sound ($v_{Sound}$ in Equation [2]) for changes to the acoustic propagation properties of the ambient environment based on temperature data from the thermometer 1972 and humidity data from the hygrometer 1974.

A heuristic set culling engine 1936 performs the processes illustrated in and discussed in connection with FIG. 16. A triangulation engine 1937 performs the processes illustrated in and discussed in connection with FIG. 17, in conjunction with a non-linear least squares solver 1938 that performs step 1762. Distance, thresholds, combination pruning shortcut data (e.g., pairs of candidate beacons in the current candidate sets that have been determined to violate the triangle inequality), map data (e.g., room and installation boundaries, spatial coordinates of acoustic obstacles and openings such as walls and passageways, etc.) and candidate set data are stored in a cache/storage 1939.

The listening device 120 may also include an inertial navigation engine (not illustrated) that receives motion data from the IMU and determines a direction and speed of movement of the listening device 120. In addition or as an alternative to any stored maximum speed of the listening device 120, velocity data from the inertial navigation engine may be used to determine the maximum possible distance that the listening device 120 may have travelled (referring to step 1640 in FIG. 16) since a prior location of the listening device 120 was determined by TDOA triangulation. If movement of the listening device 120 is mechanical (e.g., a motor driving wheels), velocity data from the mechanical drive system may also be used to determine the maximum possible distance that listening device 120 may have travelled since the prior location.

The concepts disclosed herein may be applied within a number of different devices and computer systems, including, for example, handheld computer devices, wearables, order-fulfillment robots, active "tags" attached to pallets, etc.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and TDOA navigation systems should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Although the TDOA navigation system 100 has been described using ultrasonic/acoustic/audible pulses and RF pulses, the operational concepts will work for other pulse types so long as there is a measurable time difference of arrival between pulse types and the beacon information (e.g., beacon ID, coordinates, etc.) can be encoded and conveyed by one of the pulse types. For example, light (e.g., in the visible or RF spectra) may be used instead of RF, with the beacon-specific information encoded (e.g., using pulse-width modulation) in the light pulse. Moreover, the principles can be applied to other propagation media besides air, such as having underwater beacons emit an acoustic pulse together with an information-encoded pulse of blue-green light.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk and/or other media. In addition, one or more engines of scheduling module 1830 or triangulation module 1930 may be implemented as firmware or as a state machine in hardware. For example, at least the scheduler 1837 may be implemented as a state machine by an application specific integrated circuit (ASIC), a field programmable gate array (FPGA), or some combination thereof.

As used in this disclosure, the term "a" or "one" may include one or more items unless specifically stated otherwise. Further, the phrase "based on" is intended to mean "based at least in part on" unless specifically stated otherwise.

What is claimed is:

1. A method, comprising:
    initiating transmission of a first radio frequency (RF) pulse and a first acoustic pulse from a first beacon of a plurality of beacons, wherein the first RF pulse includes information about a first location of the first beacon, a first duration of the first RF pulse being shorter than a second duration of the first acoustic pulse, and the first acoustic pulse of the first beacon having a first acoustic cone of propagation, wherein the first acoustic pulse is detectable by a listening device of the system only within the first acoustic cone of propagation, wherein the first RF pulse and the first acoustic pulse are usable by the listening device to at least partially determine a first distance of the listening device from the first beacon;
    disabling further transmissions by the first beacon until all other beacons from the plurality of beacons have transmitted their respective RF pulses;
    identifying a second beacon, from the plurality of beacons, that has a second acoustic cone of propagation that does not overlap with the first acoustic cone of propagation;
    initiating transmission of a second RF pulse and a second acoustic pulse from the second beacon after the first duration of the first RF pulse but partially coinciding with the second duration of the first acoustic pulse, wherein the second RF pulse includes information about a second location of the second beacon, and the first acoustic pulse and the second acoustic pulse have a same acoustic frequency, wherein the second RF pulse and the second acoustic pulse are usable by the listening device to at least partially determine a second distance of the listening device from the second beacon;

identifying a third beacon, from the plurality of beacons, that has a third acoustic cone of propagation that at least partially overlaps with the first acoustic cone of propagation; and configuring the third beacon not to transmit a third acoustic pulse until after a maximum time of flight of the first acoustic pulse, wherein the maximum time of flight of the first acoustic pulse is a longest duration that the first acoustic pulse is detectable by the listening device anywhere in the system, wherein the listening device determines its position within a signal propagation area of the plurality of beacons based at least in part on the first distance and the second distance.

2. The method of claim 1, further comprising:

initiating transmission of a third RF pulse and the third acoustic pulse from the third beacon after expiration of the maximum time of flight of the first acoustic pulse, wherein the third RF pulse includes information about a third location of the third beacon, and the first acoustic pulse and the third acoustic pulses have the same acoustic frequency;

identifying a fourth beacon, from the plurality of beacons, that has a fourth acoustic cone of propagation that at least partially overlaps with the third acoustic cone of propagation;

configuring the fourth beacon not to transmit a fourth acoustic pulse until after a maximum time of flight of the third acoustic pulse, wherein the maximum time of flight of the third acoustic pulse is a longest duration that the third acoustic pulse is detectable by the listening device anywhere in the system;

initiating transmission of a fourth RF pulse and the fourth acoustic pulse from the fourth beacon after expiration of the maximum time of flight of the third acoustic pulse, wherein the fourth RF pulse includes information about a fourth location of the fourth beacon, and the third acoustic pulse and the fourth acoustic pulse have the same acoustic frequency;

receiving the first RF pulse and the second RF pulse at the listening device, prior to receiving the first acoustic pulse;

receiving the third RF pulse at the listening device, prior to receiving the third acoustic pulse;

receiving the fourth RF pulse at the listening device, prior to receiving the fourth acoustic pulse;

determining a first potential distance between the first beacon and the listening device based on a first time difference of arrival (TDOA) between the first RF pulse and the first acoustic pulse;

determining a second potential distance between the second beacon and the listening device based on a second TDOA between the second RF pulse and the first acoustic pulse;

determining a third potential distance between the third beacon and the listening device based on a third TDOA between the third RF pulse and the third acoustic pulse;

determining a fourth potential distance between the fourth beacon the listening device based on a fourth TDOA between the fourth RF pulse and the fourth acoustic pulse;

determining a fifth location that is the first potential distance away from the first location, the third potential distance away from the third location, and the fourth potential distance away from the fourth location;

determining that there is no location that is the second potential distance away from the second location, the third potential distance away from the third location, and the fourth potential distance away from the fourth location; and determining that the listening device is located at the fifth location.

3. A method, comprising:

transmitting a first radio frequency (RF) pulse and a first acoustic pulse from a first beacon of a plurality of beacons, the first RF pulse and the first acoustic pulse usable by a listening device to at least partially determine a first distance of the listening device from the first beacon;

disabling transmissions from the first beacon until after each beacon of the plurality of beacons has transmitted;

transmitting a second RF pulse and a second acoustic pulse from a second beacon of the plurality of beacons, the second RF pulse and the second acoustic pulse usable by the listening device to at least partially determine a second distance of the listening device from the second beacon, wherein the second beacon is located more than a threshold distance from the first beacon, transmission of the second acoustic pulse partially overlaps in time with propagation of the first acoustic pulse, and the first acoustic pulse and the second acoustic pulse have a same acoustic frequency; and disabling transmissions from each beacon of the plurality of beacons that is less than the threshold distance from the first beacon until a predetermined duration has passed after the first beacon transmits the first acoustic pulse, wherein the listening device determines its position within a signal propagation area of the plurality of beacons based at least in part on the first distance and the second distance.

4. The method of claim 3, further comprising:

transmitting a third RF pulse and a third acoustic pulse from a third beacon of the plurality of beacons after the predetermined duration has passed after transmission of the first acoustic pulse, wherein the third beacon had been among the plurality of beacons disabled based on the first acoustic pulse.

5. The method of claim 3, wherein a third beacon is among the plurality of beacons disabled based on the first acoustic pulse, the method further comprising:

disabling transmissions from each beacon of the plurality of beacons, including the third beacon, that is less than the threshold distance from the second beacon until the predetermined duration has passed after the second beacon transmits the second acoustic pulse, thereby extending an amount of time transmissions from the third beacon are disabled.

6. The method of claim 3, wherein the first RF pulse includes information that identifies the first beacon and a location of the first beacon.

7. The method of claim 3, wherein the first RF pulse is shorter in duration than the first acoustic pulse.

8. The method of claim 3, wherein the threshold distance is based on doubling a maximum distance, from a transmitting beacon of the plurality of beacons, at which an acoustic pulse transitions from being detectable within the system to not being detectable.

9. The method of claim 3, wherein the predetermined duration is based on a longest duration that acoustic pulses transmitted by the plurality of beacons remain detectable within the system.

10. The method of claim 3, further comprising:
determining that each beacon of the plurality of beacons has transmitted; and
waiting, until the predetermined duration has passed after a last beacon transmitted its acoustic pulse, before any of the plurality of beacons transmits another acoustic pulse.

11. A computing system comprising:
at least one processor; and
memory including instructions operable to be executed by the at least one processor to perform a set of actions to configure the at least one processor to:
   transmit a first radio frequency (RF) pulse and a first acoustic pulse from a first beacon of a plurality of beacons, the first RF pulse and the first acoustic pulse usable by a listening device to at least partially determine a first distance of the listening device from the first beacon;
   disable transmissions from the first beacon until after each beacon of the plurality of beacons has transmitted;
   transmit a second RF pulse and a second acoustic pulse from a second beacon of the plurality of beacons, the second RF pulse and the second acoustic pulse usable by the listening device to at least partially determine a second distance of the listening device from the second beacon, wherein the second beacon is located more than a threshold distance from the first beacon, transmission of the second acoustic pulse partially overlaps in time with propagation of the first acoustic pulse, and the first acoustic pulse and the second acoustic pulse have a same acoustic frequency; and
   disable transmissions from each beacon of the plurality of beacons that is less than the threshold distance from the first beacon until a predetermined duration has passed after the first beacon transmits the first acoustic pulse,
   wherein the listening device determines its position within a signal propagation area of the plurality of beacons based at least in part on the first distance and the second distance.

12. The computing system 11, wherein the instructions further configure the at least one processor to:
   transmit a third RF pulse and a third acoustic pulse from a third beacon of the plurality of beacons after the predetermined duration has passed after transmission of the first acoustic pulse, wherein the third beacon had been among the plurality of beacons disabled based on the first acoustic pulse.

13. The computing system 12, wherein the instructions further configure the at least one processor to:
   disable transmissions from each beacon of the plurality of beacons, including the third beacon, that is less than the threshold distance from the second beacon until the predetermined duration has passed after the second beacon transmits the second acoustic pulse, thereby extending an amount of time transmissions from the third beacon are disabled.

14. The computing system of claim 11, wherein the first RF pulse includes information that identifies the first beacon and a location of the first beacon.

15. The computing system of claim 11, wherein the first RF pulse is shorter in duration than the first acoustic pulse.

16. The computing system of claim 11, wherein the threshold distance is based on doubling a maximum distance, from a transmitting beacon of the plurality of beacons, at which an acoustic pulse transitions from being detectable within the computing system to not being detectable.

17. The computing system of claim 11, wherein the predetermined duration is based on a longest duration that acoustic pulses transmitted by the plurality of beacons remain detectable within the computing system.

18. The computing system of claim 11, wherein the instructions further configure the at least one processor to:
   determine that each beacon of the plurality of beacons has transmitted; and
   wait, until the predetermined duration has passed after a last beacon transmitted its acoustic pulse, before any of the plurality of beacons transmits another acoustic pulse.

19. The computing system of claim 11, wherein:
   the first acoustic pulse has a first acoustic cone of propagation; and
   the first acoustic pulse is detectable by a listening device of the computing system only within the first acoustic cone of propagation.

20. The computing system of claim 12, wherein the third acoustic pulse has a third acoustic cone of propagation, and wherein the instructions further configure the at least one processor to:
   transmit a fourth acoustic pulse from a fourth beacon, the fourth acoustic pulse having a fourth acoustic cone of propagation that at least partially overlaps with the third acoustic cone of propagation.

* * * * *